(12) United States Patent
Ueno

(10) Patent No.: US 11,964,667 B2
(45) Date of Patent: Apr. 23, 2024

(54) VEHICLE CONTROL DEVICE, VEHICLE CONTROL METHOD, AND VEHICLE CONTROL SYSTEM

(71) Applicant: Hitachi Astemo, Ltd., Hitachinaka (JP)

(72) Inventor: Kentaro Ueno, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 179 days.

(21) Appl. No.: 17/424,393

(22) PCT Filed: Nov. 26, 2019

(86) PCT No.: PCT/JP2019/046186
§ 371 (c)(1),
(2) Date: Jul. 20, 2021

(87) PCT Pub. No.: WO2020/152977
PCT Pub. Date: Jul. 30, 2020

(65) Prior Publication Data
US 2022/0118995 A1  Apr. 21, 2022

(30) Foreign Application Priority Data
Jan. 21, 2019 (JP) ................. 2019-007901

(51) Int. Cl.
*B62D 6/00* (2006.01)
*B60W 30/10* (2006.01)
*B60W 50/06* (2006.01)

(52) U.S. Cl.
CPC ............ *B60W 50/06* (2013.01); *B60W 30/10* (2013.01); *B60W 2556/10* (2020.02); *B62D 6/00* (2013.01)

(58) Field of Classification Search
CPC ........ B62D 15/025; B62D 6/00; B62D 6/002; B60W 2556/10; B60W 30/10;
(Continued)

(56) References Cited

U.S. PATENT DOCUMENTS

2005/0096828 A1*  5/2005  Uemura .............. B60T 8/17557
                                                          701/1
2006/0041356 A1*  2/2006  Shirato .................... B62D 1/28
                                                          701/41
(Continued)

FOREIGN PATENT DOCUMENTS

JP          2010-205228 A      9/2010
JP          2012-58984 A       3/2012
(Continued)

OTHER PUBLICATIONS

JP2012058984A Fuzi Heavy Industries Koyama Hajime Mar. 2012 (Year: 2012).*

(Continued)

*Primary Examiner* — B M M Hannan
(74) *Attorney, Agent, or Firm* — Crowell & Moring LLP

(57) ABSTRACT

In a vehicle control device, a vehicle control method, and a vehicle control system according to the present invention, in control of a motion of a vehicle which is based on a signal relating to a target trajectory and a signal relating to a traveling state, a target traveling state of the vehicle after a predetermined time period corresponding to a delay element in the control of the motion of the vehicle is predicted, and a command for achieving the predicted target traveling state is output to an actuator configured to control the motion of the vehicle, thereby suppressing occurrence of a deviation of a traveling trajectory from the target trajectory and occurrence of an unstable behavior, for example, meandering, due to the delay element in a vehicle motion control system which is based on the target trajectory.

10 Claims, 21 Drawing Sheets

(58) Field of Classification Search
CPC ............. B60W 50/06; B60W 2510/20; B60W 2710/0666; B60W 2710/182; B60W 2710/207; B60W 50/0097; B60W 60/001
USPC .......................................................... 701/25
See application file for complete search history.

(56) References Cited

U.S. PATENT DOCUMENTS

| | | | |
|---|---|---|---|
| 2013/0096778 A1* | 4/2013 | Goto .................... | B62D 5/008 701/41 |
| 2014/0240115 A1* | 8/2014 | Igarashi ............... | B60W 30/08 340/435 |
| 2017/0029027 A1* | 2/2017 | Mizutani ............... | B62D 6/002 |
| 2017/0120908 A1* | 5/2017 | Oniwa ................ | B60W 50/082 |
| 2017/0212513 A1 | 7/2017 | Iida et al. | |
| 2017/0259849 A1* | 9/2017 | Fukukawa ............ | G01C 21/34 |
| 2017/0313321 A1* | 11/2017 | Asakura ............ | B60W 50/0097 |
| 2018/0057054 A1* | 3/2018 | Tokoro ................. | B60W 10/20 |
| 2018/0086351 A1 | 3/2018 | Zhu et al. | |
| 2018/0178839 A1* | 6/2018 | Ide ....................... | B62D 15/029 |
| 2018/0273027 A1* | 9/2018 | Tomozawa ......... | B62D 15/0285 |
| 2018/0304890 A1 | 10/2018 | Sone et al. | |
| 2019/0113914 A1* | 4/2019 | Abe ..................... | B60W 50/08 |
| 2019/0118831 A1* | 4/2019 | Mimura ............... | B60W 30/00 |
| 2019/0152476 A1* | 5/2019 | Hajika .................. | B62D 6/003 |
| 2019/0155293 A1* | 5/2019 | Oniwa .................. | G01C 21/20 |
| 2019/0179330 A1* | 6/2019 | Oniwa ..................... | G05D 1/02 |
| 2019/0263368 A1* | 8/2019 | Takahashi ....... | B60W 30/18145 |
| 2020/0298876 A1* | 9/2020 | Mimura ................. | B60R 16/02 |
| 2020/0317196 A1* | 10/2020 | Yoshida .............. | B60W 30/181 |
| 2021/0009128 A1* | 1/2021 | Jokela ................ | B60W 30/146 |
| 2023/0015466 A1* | 1/2023 | Jiralerspong .......... | G08G 1/166 |

FOREIGN PATENT DOCUMENTS

| | | |
|---|---|---|
| JP | 5310116 B2 | 10/2013 |
| JP | 2016-37149 A | 3/2016 |
| JP | 2016-199080 A | 12/2016 |
| JP | 2018-177121 A | 11/2018 |

OTHER PUBLICATIONS

Extended European Search Report issued in European Application No. 19911089.1 dated May 10, 2022 (11 pages).

McNaughton., "Parallel Algorithms for Real-Time Motion Planning", The Robotics Institute, Jul. 2011, pp. 1-233, XP055592762, (11 pages).

Gutjahr et al., "Lateral Vehicle Trajectory Optimization Using Constrained Linear Time-Varying MPC", IEEE Transactions on Intelligent Transpiration Systems, Jun. 2017, pp. 1586-1595, vol. 18, No. 6, XP011651024, (10 pages).

International Search Report (PCT/ISA/210) issued in PCT Application No. PCT/JP2019/046186 dated Feb. 4, 2020 with English translation (six (6) pages).

Japanese-language Written Opinion (PCT/ISA/237) issued in PCT Application No. PCT/JP2019/046186 dated Feb. 4, 2020 (five (5) pages).

International Preliminary Report on Patentability (PCT/IB/326, PCT/IB/373 & PCT/IB/338) issued in PCT Application No. PCT/JP2019/046186 dated Jul. 29, 2021, including English translation of document C2 (Japanese-language Written Opinion (PCT/ISA/237) filed on Jul. 20, 2021) (15 pages).

* cited by examiner

LANE KEEPING USING CAMERA

FOLLOWING PRECEDING VEHICLE
USING RADAR OR CAMERA

TRAVELING ON ROUTE USING MAP AND AD

VEHICLE CONTROL DEVICE, VEHICLE CONTROL METHOD, AND VEHICLE CONTROL SYSTEM

TECHNICAL FIELD

The present invention relates to a vehicle control device, a vehicle control method, and a vehicle control system, which are configured to control a motion of a vehicle based on a target trajectory.

BACKGROUND ART

A vehicle control system of Patent Document 1 includes: a trajectory generation determination unit having an emergency trajectory generating unit for calculating an emergency trajectory while driving is being switched from a system to a driver at the time of a fault; and a motion control unit having a trajectory retaining unit for retaining the emergency trajectory and a trajectory switching unit for switching whether to travel in the emergency trajectory retained by the trajectory retaining unit on the basis of a fault state detected by a malfunction detection unit.

REFERENCE DOCUMENT LIST

Patent Document

Patent Document 1: JP 2016-37149 A

SUMMARY OF THE INVENTION

Problem to be Solved by the Invention

In a vehicle control system including a higher-level controller configured to perform recognition and determination, such as outside recognition, trajectory planning, and route generation, and a lower-level controller configured to acquire a signal relating to a target trajectory from the higher-level controller to control a motion of a vehicle, the recognition and the determination performed in the higher-level controller require sophisticated processing, and thus the signal relating to the target trajectory, which is acquired by the lower-level controller, may be delayed.

Moreover, in an actuator configured to control the motion of the vehicle, a response to a command may be delayed, and further, response delay may also occur in the motion of the vehicle in response to an operation of the actuator.

There is thus a concern that, due to such a delay element as described above, a traveling trajectory may deviate from the target trajectory, or an unstable behavior, for example, meandering, may occur.

The present invention has been made in view of the circumstances of the related art and has an object to provide a vehicle control device, a vehicle control method, and a vehicle control system which are capable of reducing delay of a traveling trajectory with respect to a target trajectory.

Means for Solving the Problem

According to one aspect of the present invention, in control of a motion of a vehicle which is based on a signal relating to a target trajectory and a signal relating to a traveling state, a target traveling state after a predetermined time period corresponding to a delay element in the control of the motion of the vehicle is predicted, and a command for achieving a target traveling state is output to an actuator configured to control the motion of the vehicle.

Effects of the Invention

According to the present invention, it is possible to reduce delay of the traveling trajectory with respect to the target trajectory.

MODE FOR CARRYING OUT THE INVENTION

Figure 1:
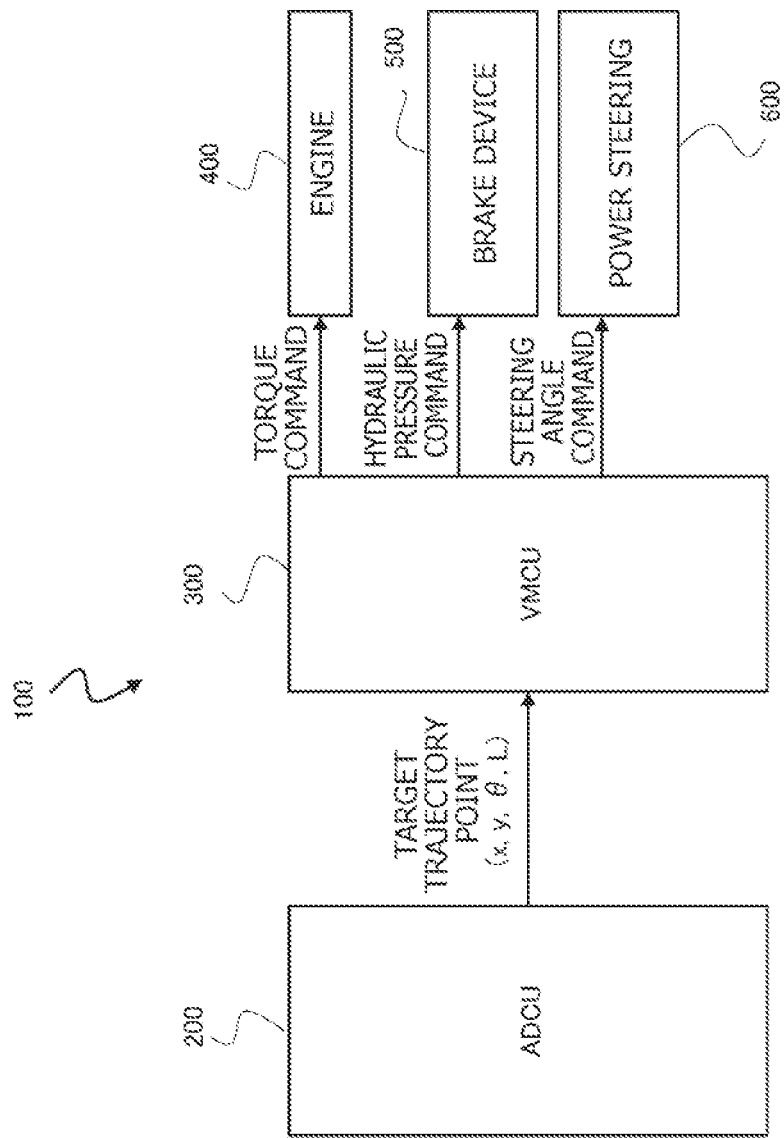
FIG. 1 is a block diagram of a vehicle control system.

Referring to the drawings, description is now given of a vehicle control device, a vehicle control method, and a vehicle control system according to an embodiment of the present invention.

FIG. 1 is a block diagram for illustrating one aspect of a vehicle control system.

A vehicle control system 100 of FIG. 1 is a system configured to control a motion of a vehicle 10, and includes an automatic driving control unit (ADCU) 200 serving as a first controller and a vehicle motion control unit (VMCU) 300 serving as a second controller.

ADCU 200 and VMCU 300 are each an electronic control unit which includes a microcomputer including a CPU, a ROM, a RAM, and others.

Figure 2:
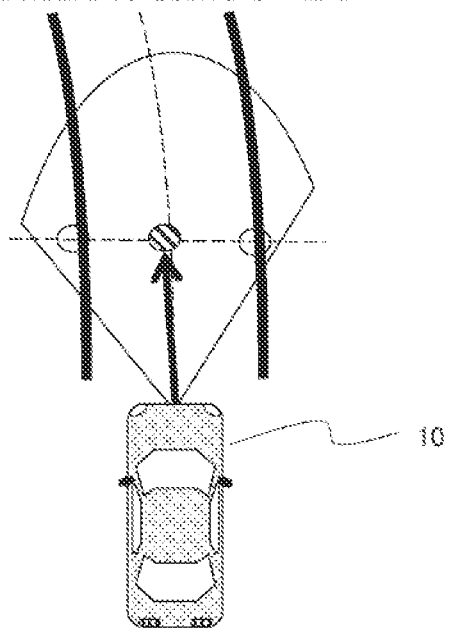
FIG. 2 is a diagram for illustrating a lane keeping assist function.
Figure 3:
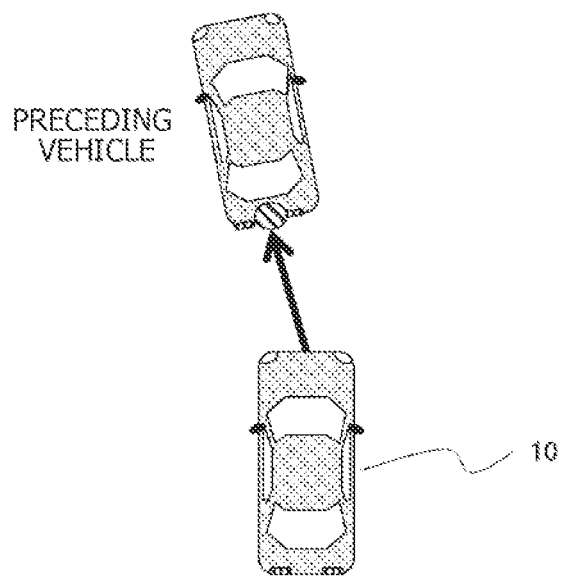
FIG. 3 is a diagram for illustrating an adaptive cruise control function.
Figure 4:
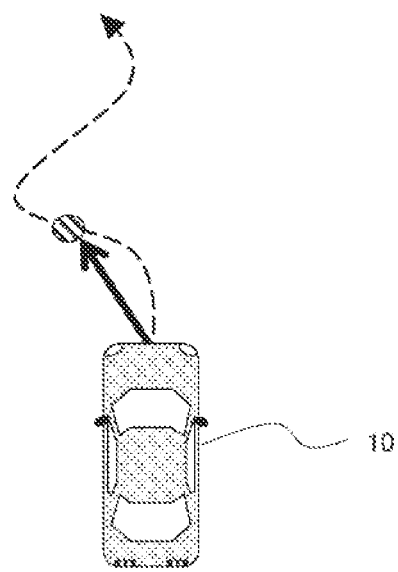
FIG. 4 is a diagram for illustrating an automatic driving function.

ADCU 200 generates a target trajectory in driving assist functions illustrated in FIG. 2 to FIG. 4, for example.

FIG. 2 is an illustration of a lane keeping assist function (LKS) of keeping a position of the vehicle at around a center of a lane recognized by a camera.

In the lane keeping assist function, for example, ADCU 200 sets a target trajectory point being a target position of the own vehicle at around the center of left and right white lines which have been recognized, and sets a vehicle speed set by a driver as a vehicle speed at the target trajectory point.

FIG. 3 is an illustration of an adaptive cruise control function (ACC) of recognizing a preceding vehicle with radar or the camera and causing the vehicle to travel while keeping an inter-vehicle distance to the preceding vehicle at a fixed distance.

In the adaptive cruise control function, when the preceding vehicle is present, ADCU 200 sets the target trajectory point on the preceding vehicle, and sets such a vehicle speed as to enable a predetermined inter-vehicle distance to the preceding vehicle to be kept as the vehicle speed at the target trajectory point.

FIG. 4 is an illustration of an automatic driving function (AD) of setting a target route to a destination based on, for example, map information and results of outside recognition and assisting in autonomous traveling to the destination.

In the automatic driving function, ADCU 200 sets the target trajectory point on the set target route, and sets a speed limit on a road on which the vehicle is traveling or a target speed in the automatic driving as the vehicle speed at the target trajectory point.

Figure 5:
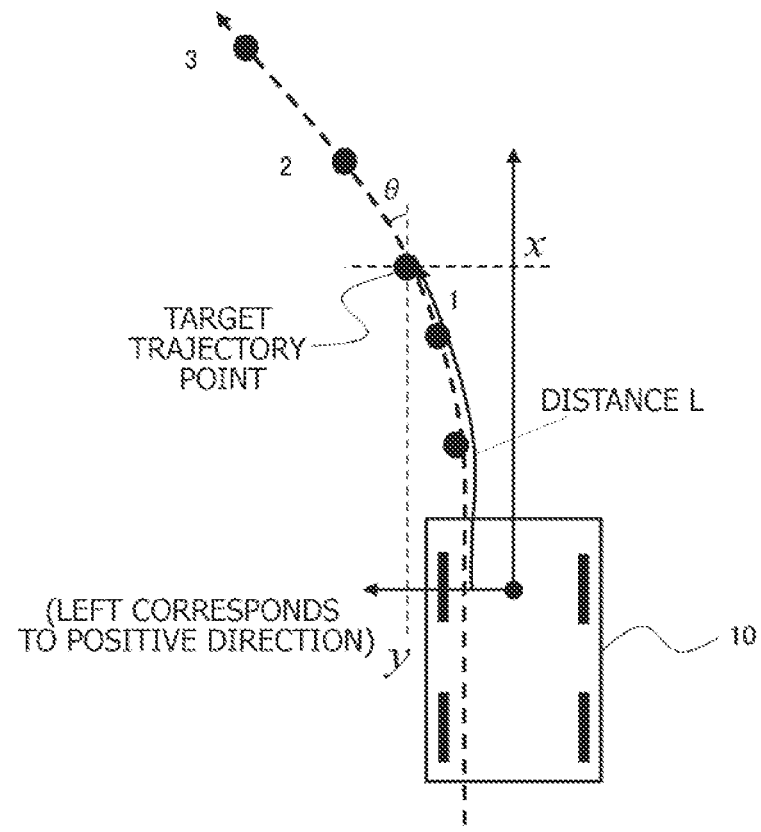
FIG. 5 is a diagram for illustrating how positional information on a target trajectory point is expressed.

The target trajectory point is represented by, as illustrated in FIG. 5, coordinates (x, y) on a vehicle coordinate system in which a front-and-rear direction of the own vehicle is set as an x axis and a vehicle-width direction of the own vehicle is set as a y axis, a yaw angle θ being an angle formed by a vehicle front-and-rear axis direction at the target trajectory point and a front-and-rear axis direction at a current time, and a distance L for which the vehicle is to travel on the trajectory at a curve.

On the y axis of the vehicle coordinate system, a left-turning direction is represented as a positive direction.

Furthermore, the target trajectory is determined on the absolute coordinate system, and hence the trajectory is not always started at an origin of the vehicle coordinate system, for example, a center of gravity of the vehicle.

ADCU 200 outputs a signal (x, y, θ, L) relating to the target trajectory point to VMCU 300 being the vehicle control device.

Figure 6:
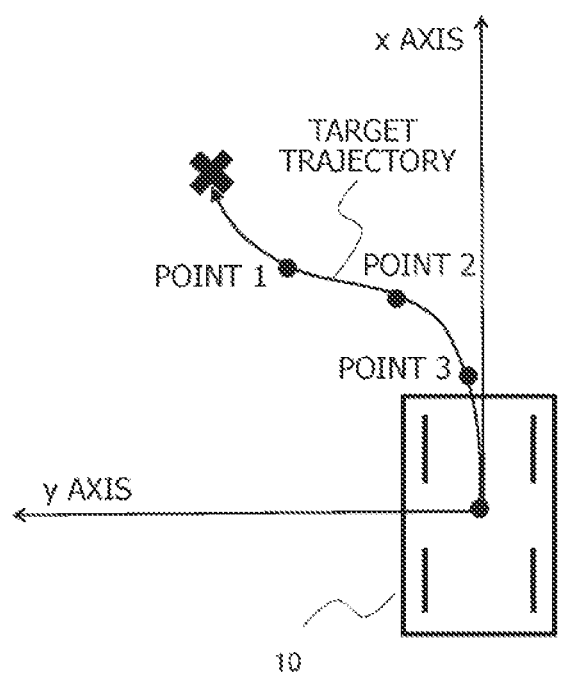
FIG. 6 is a diagram for illustrating generation of a target trajectory through accumulation of the target trajectory points.

As illustrated in FIG. 6, VMCU 300 accumulates signals (x, y, θ, L) relating to the target trajectory points acquired from ADCU 200 to generate the target trajectory. That is, VMCU 300 connects a plurality of target trajectory points that have been acquired in a time series to generate the target trajectory.

Then, VMCU 300 serving as the vehicle control device obtains commands relating to the motion of the own vehicle so that the vehicle travels along the target trajectory at the set speed, and outputs operation commands to an engine 400, a hydraulic brake device 500, and a power steering device 600, each of which corresponds to an actuator configured to control the motion of vehicle 10.

More specifically, VMCU 300 outputs a torque command to engine 400 being a drive device for vehicle 10, outputs a hydraulic pressure command to hydraulic brake device 500 being a control device for vehicle 10, and outputs a steering angle command to power steering device 600 being a steering device for vehicle 10, to thereby control the motion of vehicle 10.

Figure 7:
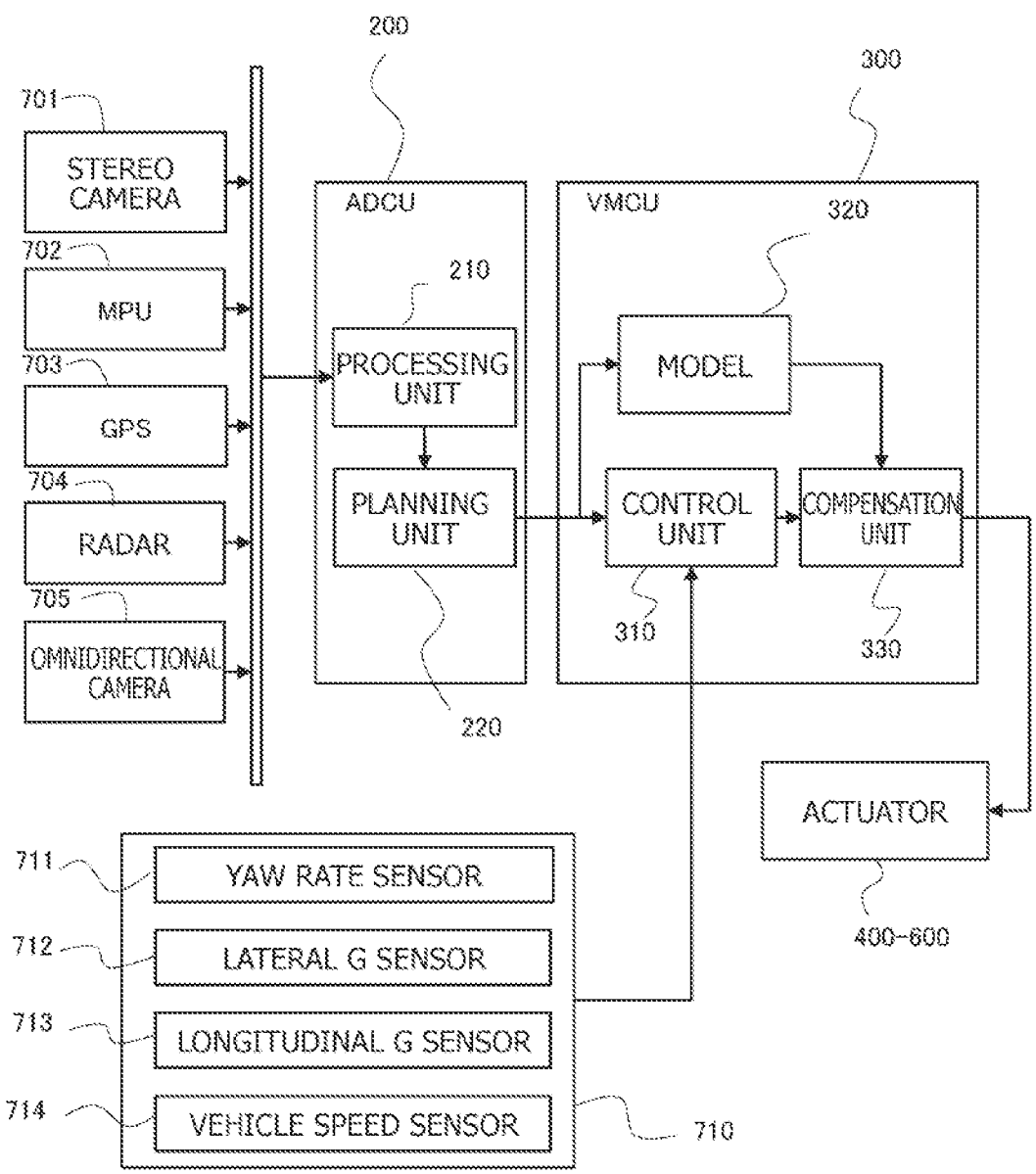
FIG. 7 is a block diagram for illustrating a detailed configuration of the vehicle control system.

FIG. 7 is a functional block diagram for illustrating vehicle control system 100 illustrated in FIG. 1 in more detail.

Vehicle control system 100 includes, in addition to ADCU 200 and VMCU 300, devices for recognizing outside situations and a position of the vehicle, which include, for example, a stereo camera 701, a high-definition map (MPU) 702, a global positioning system (GPS) 703, a radar 704, and an omnidirectional camera 705.

Vehicle control system 100 also includes traveling state detection sensors 710, each configured to detect a traveling state of vehicle 10.

Traveling state detection sensors 710 include, for example, a yaw rate sensor 711 configured to detect a yaw rate of vehicle 10, a lateral acceleration sensor 712 configured to detect a lateral acceleration of vehicle 10, a longitudinal acceleration sensor 713 configured to detect a longitudinal acceleration of vehicle 10, and a vehicle speed sensor 714 configured to detect a traveling speed of vehicle 10.

ADCU 200 includes a recognition processing unit 210 and a trajectory planning unit 220.

Recognition processing unit 210 performs processing of recognizing, for example, the outside situations of the vehicle and the position of the vehicle based on pieces of information from stereo camera 701, high-definition map 702, global positioning system 703, radar 704, and omnidirectional camera 705, for example.

Recognition processing unit 210 outputs the recognized information on the outside situations of the own vehicle and the position of the vehicle, for example, to trajectory planning unit 220.

Trajectory planning unit 220 obtains the target trajectory point (x, y, θ, L) based on the information on the outside situations and the position of the vehicle, for example, and outputs to VMCU 300 a signal indicating the target trajectory point (x, y, θ, L) as the signal relating to the target trajectory.

VMCU 300 includes a vehicle motion control unit 310, a vehicle model 320, and a predictive compensation unit 330.

Figure 8:
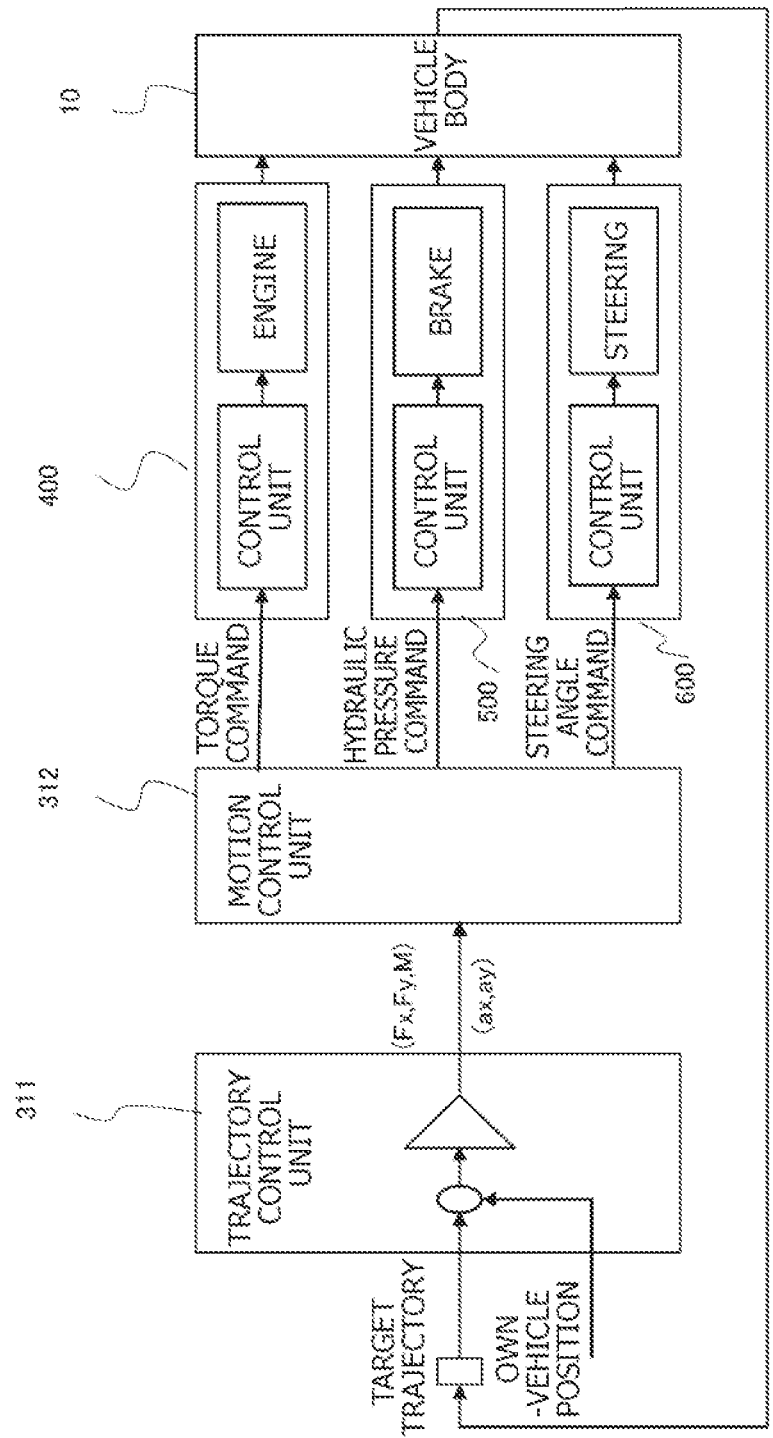
FIG. 8 is a block diagram for illustrating a motion control system which is based on the target trajectory.

FIG. 8 is a functional block diagram for illustrating a function of control of following the target trajectory by vehicle motion control unit 310, and vehicle motion control unit 310 includes a trajectory control unit 311 and a motion control unit 312.

Vehicle motion control unit 310 accumulates signals indicating the target trajectory points (x, y, θ, L) to generate the target trajectory.

In this case, the target trajectory is defined on the vehicle coordinate system, and hence the position of the vehicle is set as the origin. When the target trajectory passes through the origin, this indicates that accurate following control is being performed, and when the target trajectory does not pass through the origin, this indicates that there is a deviation between the position of the vehicle and the target trajectory.

In view of this, in order to reduce the deviation between the position of the vehicle and the target trajectory, trajectory control unit 311 performs feedback control, for example, to calculate a motion command. The motion command calculated by trajectory control unit 311 is expressed by a force (Fx, Fy, M) or an acceleration (ax, ay).

Motion control unit 312 converts the motion command calculated by trajectory control unit 311 into commands directed to the actuators including engine 400, hydraulic brake device 500, and power steering device 600, for example, outputs the torque command to engine 400, outputs the hydraulic pressure command to hydraulic brake device 500, and outputs the steering angle command to power steering device 600.

In order to achieve the command from motion control unit 312, each of the actuators performs electronic control, such as feedforward control which is based on a command value, that is, a target value, and feedback control based on a deviation between the command value and a control amount. As a result, the position of the vehicle changes depending on an external environment, and the target trajectory thus changes.

Predictive compensation unit 330 is a functional block for compensating for response delay in each control procedure and each plant of vehicle control system 100, that is, a delay element (time delay element) in the control of the motion of vehicle 10 which is based on the target trajectory and the traveling state of vehicle 10.

The abovementioned delay element includes, for example, delay of detection in each sensor, delay of processing in recognition processing unit 210 and trajectory planning unit 220 of ADCU 200, delay of communication of the signal indicating the target trajectory point from ADCU 200 to VMCU 300, delay of a response to the command in the actuator, for example, power steering device 600, and further, delay of a response of vehicle 10 to the operation of the actuator.

Furthermore, those delay elements may cause a control deviation to occur, decreasing accuracy of following the target trajectory. The delay elements may also cause unstable behavior, for example, meandering, to occur.

In view of this, predictive compensation unit 330 predicts a command value of the vehicle motion, that is, the target traveling state, at a time point advanced by a predetermined time period PPT corresponding to the delay element, and outputs the predicted command value to the actuator, to thereby cause the actuator to operate at a timing earlier by predetermined time period PPT to compensate for the delay element.

Figure 9:
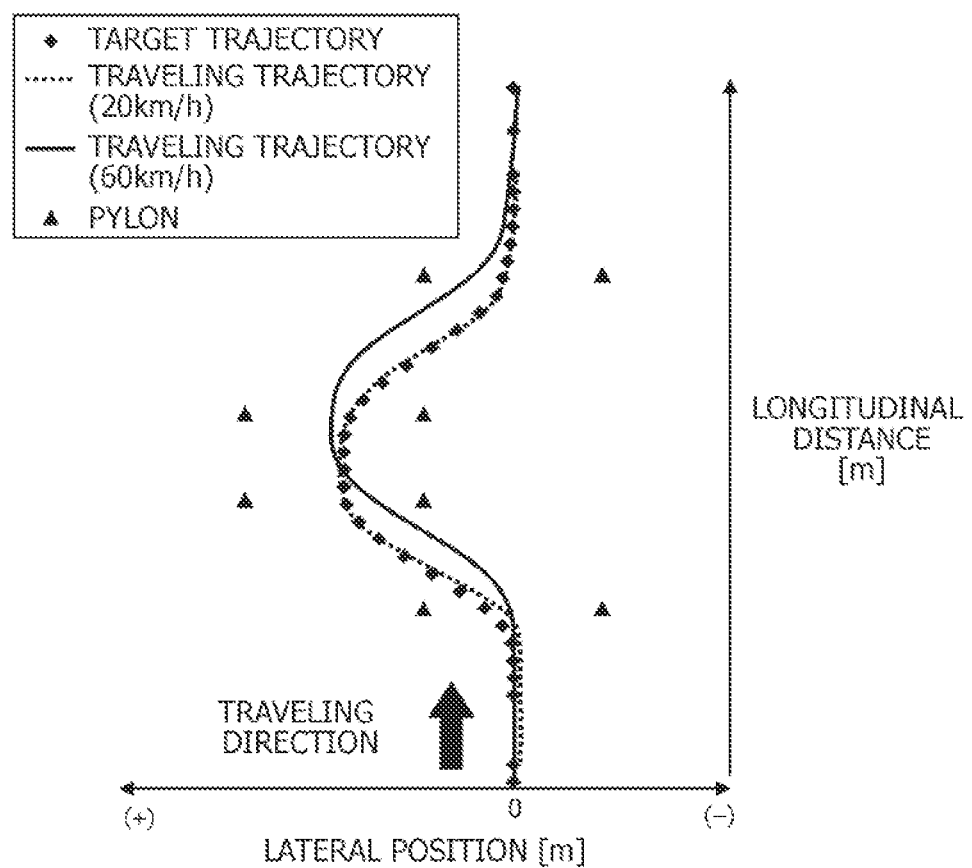
FIG. 9 is a diagram for illustrating delay of traveling trajectories with respect to the target trajectory.
Figure 10:
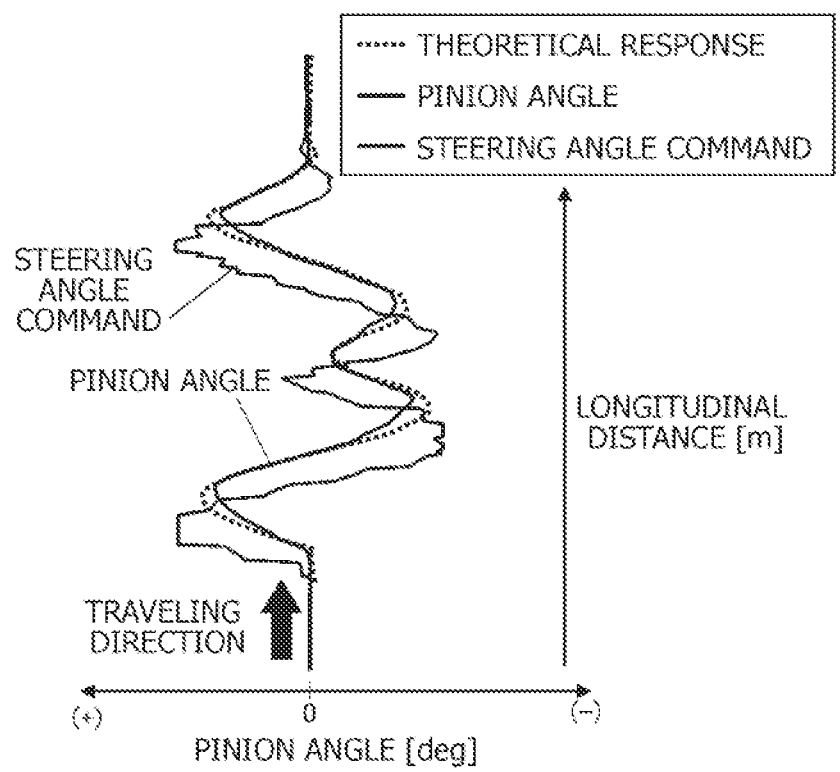
FIG. 10 is a diagram for illustrating response delay of a power steering device (actuator).

FIG. 9 and FIG. 10 are illustrations of how, when double-lane change in which a lane change is performed two times in a row is automatically performed, an actual traveling trajectory is delayed more with respect to the target trajectory as the vehicle speed increases mainly due to delay of steering.

FIG. 9 is a diagram illustrating correlation between actual traveling trajectories and the target trajectory, and there are illustrated an actual traveling trajectory exhibited when the vehicle speed is 20 km/h and an actual traveling trajectory exhibited when the vehicle speed is 60 km/h.

In this case, the delay of the actual traveling trajectory with respect to the target trajectory is greater when the vehicle speed is 60 km/h than when the vehicle speed is 20 km/h.

FIG. 10 is an illustration of correlation between an actual steering angle and the steering angle command exhibited when the vehicle speed is 60 km/h, and there is illustrated how the actual steering angle is delayed with respect to the steering command, that is, the delay of a response to the command in power steering device 600.

In short, due to the delay of the response to the command in power steering device 600 which is illustrated in FIG. 10, as illustrated in FIG. 9, the traveling trajectory of vehicle 10 is delayed with respect to the target trajectory, and in order to increase the following accuracy in trajectory following control, it is required to compensate for decrease in following accuracy due to the response delay.

Figure 11:
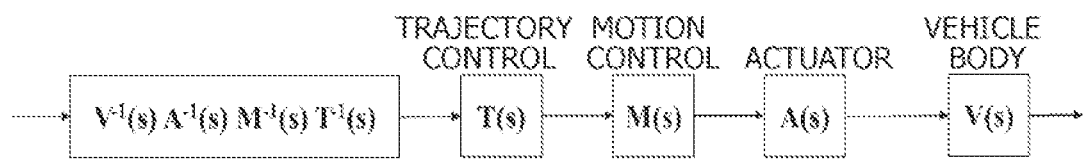
FIG. 11 is a block diagram for illustrating a feedforward method using an inverse model.

As a method for compensating for the response delay, as illustrated in FIG. 11, there is a feedforward method of inserting an inverse model of a response model of a control system.

The inverse model is a model to which a motion trajectory, which is output of a dynamical system, is input, and from which a motion command is output.

Furthermore, vehicle control system 100 is a system for deriving a command for achieving the target trajectory, and is capable of compensating for, for example, the delay of the response to the command in power steering device 600.

However, the feedforward control system using the inverse model has the following problems.

(1) Each model element is proper in general, and the calculation of the inverse model requires differentiation. Accordingly, it is difficult or impossible to implement the inverse model on a computer.

(2) When there is a feedback element between models, the entire inverse model is not a product of the inverse models of respective elements, resulting in a complicated expression. Moreover, depending on a position at which a feedforward term is inserted, the feedforward term itself changes the entire response model, resulting in unstable control.

(3) In a case of an uncontrollable model, the inverse model cannot be calculated.

(4) When a time-varying model or a non-linear model is included, the inverse model cannot be calculated.

In order to solve these problems, there exist various methods such as local modeling, application of a bandpass filter, an observer and optimal control, and model prediction control.

However, even with these methods, when the method is applied to control of the entire vehicle illustrated in FIG. 8, there is strong nonlinearity, and a plurality of sub-systems correlate with each other in a complicated manner. It is thus extremely difficult to comprehensively control the vehicle.

One of the causes of the difficulty in implementation of a response compensator having a complicated system is that the system is expressed in a transfer function which is based on a frequency response, and that the response delay is treated as phase delay that changes depending on a frequency. However, delay in actual cases is time delay.

In view of this, in vehicle control system 100, instead of compensating for the frequency response, improvement in response is to be achieved only with the purpose of speeding up a resultant behavior.

Figure 12:
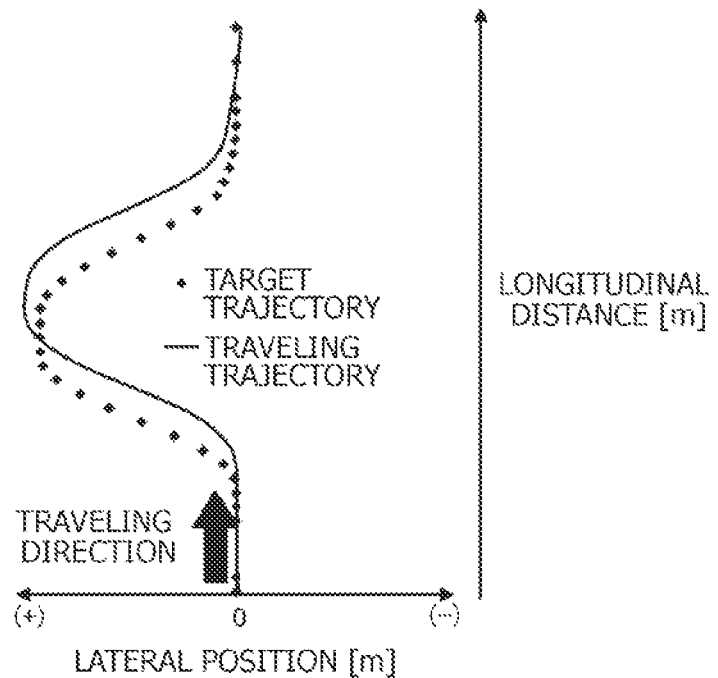
FIG. 12 is a diagram for illustrating delay of the traveling trajectory with respect to the target trajectory.
Figure 13:
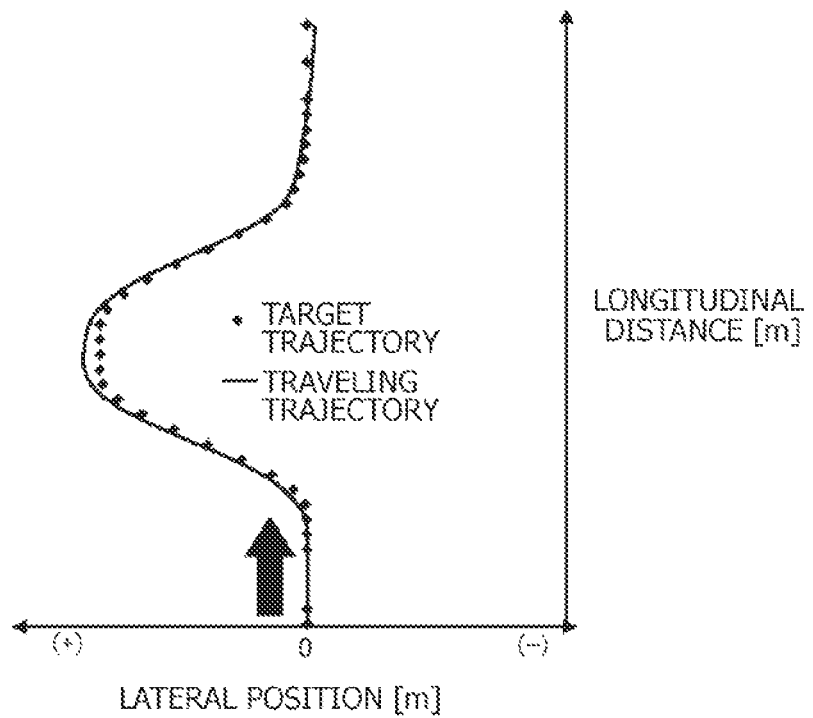
FIG. 13 is a diagram for illustrating correlation between the target trajectory and the traveling trajectory exhibited when a behavior of the vehicle is sped up.

FIG. 12 is an illustration of a state in which the actual traveling trajectory is delayed with respect to the target trajectory, and FIG. 13 is an illustration of a state in which the delay of the actual traveling trajectory with respect to the target trajectory is suppressed by advancing the vehicle behavior by predetermined time period PPT.

In short, in order to achieve the traveling trajectory of FIG. 13, it is only required to cause the actuator to operate at the timing earlier by predetermined time period PPT corresponding to the delay element.

In view of this, predictive compensation unit 330 of VMCU 300 predicts a command value to be calculated at the timing later by predetermined time period PPT, that is, the target traveling state after predetermined time period PPT, and outputs the predicted command value to the actuator, to thereby suppress the delay of the actual traveling trajectory with respect to the target trajectory to improve the response of the trajectory following control.

In order to obtain the command value predicted to be calculated at the timing later by predetermined time period PPT, predictive compensation unit 330 obtains a future vehicle behavior starting at the current position of the vehicle by repeating a simulation which is based on the model (forward model) of the control system illustrated in FIG. 8 the number of times which corresponds to predetermined time period PPT (that is, "n" times corresponding to a task cycle), and outputs the motion command obtained in the n-th simulation to the actuator to control the actuator.

Figure 14:
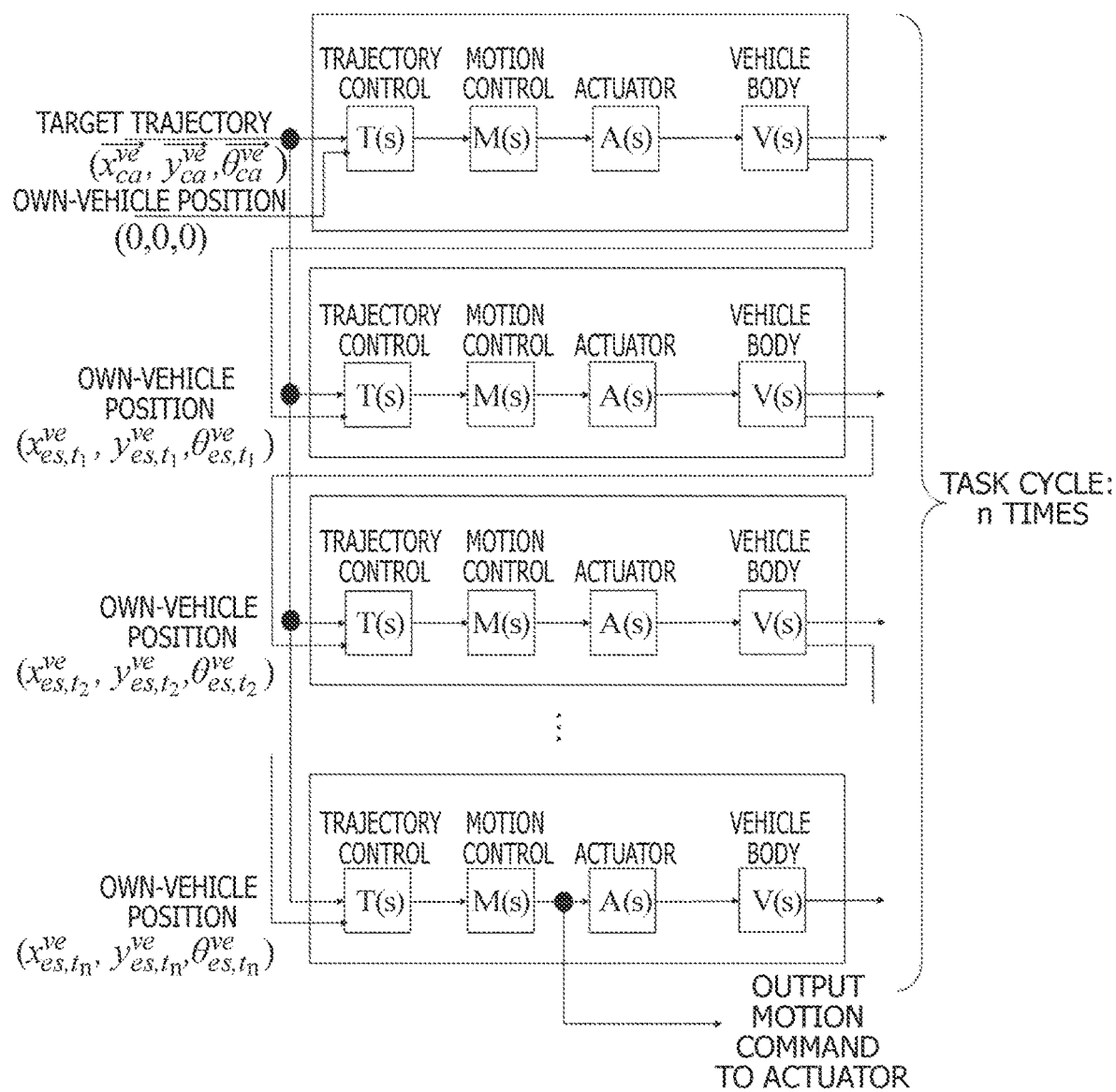
FIG. 14 is a block diagram for illustrating processing of calculating a vehicle behavior through a simulation for predicting a command value.
Figure 15:
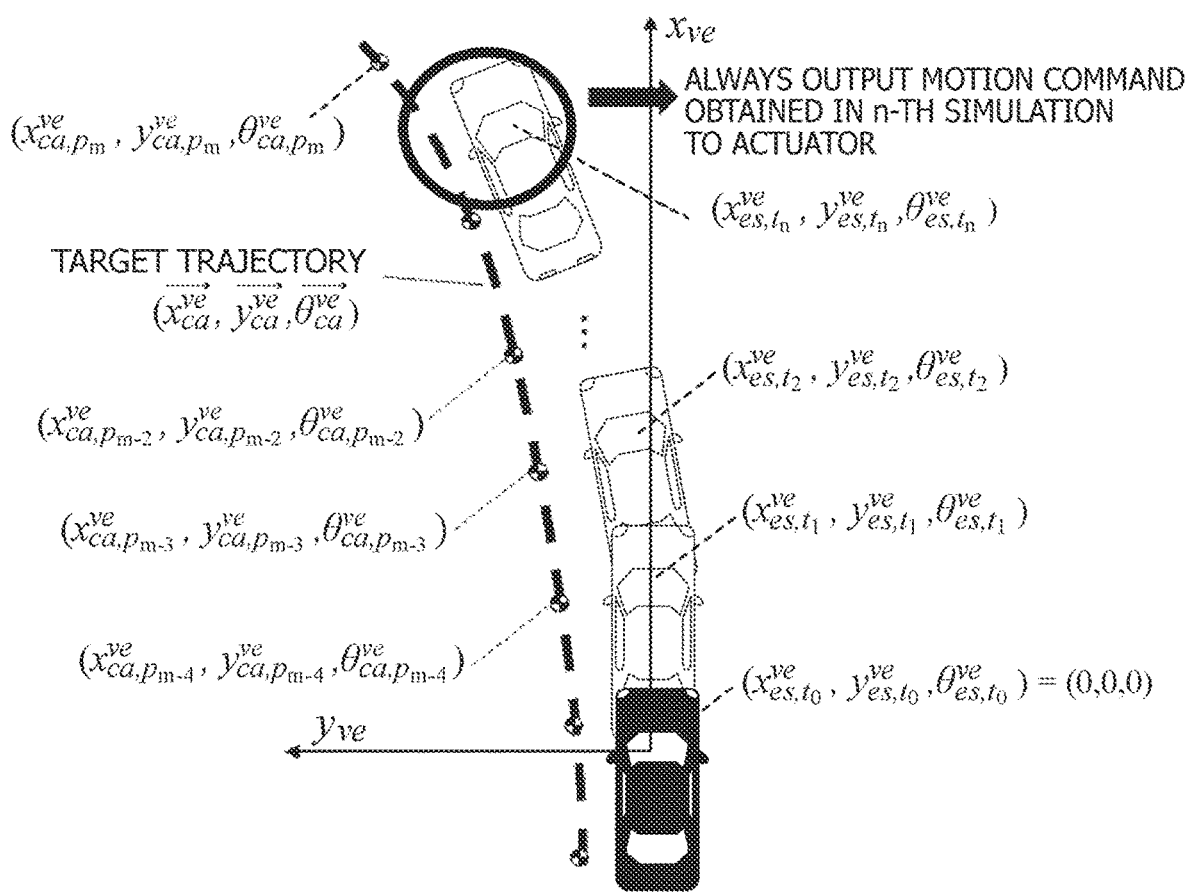
FIG. 15 is a diagram for illustrating results of calculation of the vehicle behavior obtained through the simulation.

FIG. 14 is a conceptual diagram for illustrating repetition of the simulation, and FIG. 15 is an exemplary illustration of results of calculation of the vehicle behavior obtained through the simulation.

First, predictive compensation unit 330 serving as a model prediction controller sets the origin $(x_{es\_t0}, y_{es\_t0}, \theta_{es\_t0})=(0, 0, 0)$ of the vehicle coordinate system at a time t0 of start of calculation as a position of the vehicle, and gives information on the position of the vehicle $(x_{es\_t0}, y_{es\_t0}, \theta_{es\_t0})=(0, 0, 0)$ and the target trajectory (that is, initial prediction values) to a prediction model, for example, a transfer function model, predicts a vehicle behavior exhibited when a motion command for reducing a deviation between the position of the vehicle $(x_{es\_t0}, y_{es\_t0}, \theta_{es\_t0})$ and the target trajectory is given, and obtains, in a simulated manner, a position of the vehicle $(x_{es\_t1}, y_{es\_t1}, \theta_{es\_t1})$ at a future time $t_1$, which is a time advanced by a sampling cycle.

The motion command is obtained by, for example, a method of determining a steering angle based on a deviation between a position at which the own vehicle is to arrive after a preview point time period and the target position.

Next, predictive compensation unit 330 gives the predicted position of the vehicle $(x_{es\_t1}, y_{es\_t1}, \theta_{es\_t1})$ at time $t_1$ and the target trajectory to the prediction model, predicts a vehicle behavior exhibited when the motion command for reducing a deviation between the position of the vehicle $(x_{es\_t1}, y_{es\_t1}, \theta_{es\_t1})$ and the target trajectory is given, and predicts a position of the vehicle $(x_{es\_t2}, y_{es\_t2}, \theta_{es\_t2})$ at a time $t_2$, which is further advanced from time $t_1$.

Furthermore, predictive compensation unit 330 gives the predicted position of the vehicle $(x_{es\_t2}, y_{es\_t2}, \theta_{es\_t2})$ at time $t_2$ and the target trajectory to the prediction model, predicts a vehicle behavior exhibited when the motion command for reducing a deviation between the position of the vehicle $(x_{es\_t2}, y_{es\_t2}, \theta_{es\_t2})$ and the target trajectory is given, and predicts a position of the vehicle $(x_{es\_t3}, y_{es\_t3}, \theta_{es\_t3})$ at a time $t_3$, which is further advanced from time $t_2$.

After that, predictive compensation unit 330 repeats the abovementioned simulation (that is, model prediction control) "n" times, which corresponds to predetermined time period PPT corresponding to the delay element in the motion control of vehicle 10, to thereby predict the motion command predicted to be calculated after predetermined time period PPT from the current time, and outputs the predicted motion command to the actuator, for example, power steering device 600.

In other words, predictive compensation unit 330 repeats inputting a history of the command to the actuator to the prediction model, to thereby predict the motion command predicted to be calculated after predetermined time period PPT from the current time.

The abovementioned simulation is performed on condition that the target trajectory points at times later than predetermined time period PPT have been acquired. This is because, when only the target trajectory points at times earlier than predetermined time period PPT have been acquired, the motion command cannot be predicted.

Through the execution of the predictive compensation described above, the actuator is consequently operated at the timing earlier by predetermined time period PPT. Thus, when the motion control of vehicle 10 has a delay element, the delay of the actual traveling trajectory with respect to the target trajectory can be suppressed, and hence the response of the trajectory following control is improved.

The compensation of the response delay through repetition of the abovementioned simulation (that is, the predictive compensation) has the following features.

(1) The inverse model is not required, and hence the compensation can be applied to any model for which the simulation can be performed without distinguishing an uncontrollable model, a time-varying model, and a non-linear model.

(2) Through the increase of the accuracy of the simulation, it is possible to increase control performance of the trajectory following control.

Predetermined time period PPT, which defines the number of times of repetition of the simulation, is a time period adapted in advance in accordance with the delay element in the motion control of vehicle 10.

The delay elements in the motion control of vehicle 10 include, for example, the response delay of the actuator, the delay of the signal indicating the target trajectory point (that is, the signal relating to the target trajectory), and the delay of the vehicle itself, and predetermined time period PPT is determined based on those delay elements so as to suppress the delay of the actual traveling trajectory with respect to the target trajectory.

For example, when the delay of the actual traveling trajectory with respect to the target trajectory is caused mainly by the response delay of the actuator, for example, power steering device 600, predetermined time period PPT may be set to a time period which corresponds to a response delay time period of the actuator, that is, power steering device 600.

Furthermore, when there is also delay of the signal indicating the target trajectory point (that is, the signal relating to the target trajectory) in addition to the response delay of the actuator, predetermined time period PPT is adapted based on the response delay time period of the actuator and a delay time period of the signal indicating the target trajectory point.

The delay of the signal indicating the target trajectory point is caused by, for example, the delay of recognition of the outside situations or the like, the delay of processing of the signal indicating the target trajectory point in ADCU 200, and further, the delay of communication of the signal indicating the target trajectory point from ADCU 200 to VMCU 300.

Furthermore, in the adaptation of predetermined time period PPT based on the delay time period of the signal indicating the target trajectory point, it is preferred that predetermined time period PPT be adapted based on the delay time period of a signal having the largest delay among a plurality of signals (x, y, θ) indicating the target trajectory points.

When predetermined time period PPT is set based on the response delay time period of the actuator and the delay time period of the signal indicating the target trajectory point, predetermined time period PPT is adapted based on a time period obtained by subtracting the delay time period of the signal indicating the target trajectory point from the response delay time period of the actuator.

Furthermore, in a case of a system in which the delay time period of the signal indicating the target trajectory point is equal to or longer than the response delay time period of the actuator, predetermined time period PPT is set to zero, and VMCU 300 is configured to control the actuator based on the motion command value at the current timing.

When there is no delay of the signal indicating the target trajectory point, VMCU 300 is only required to predict the motion command at a time point advanced from the current time by the response delay time period of the actuator. However, when the delay of the signal indicating the target trajectory point has occurred, VMCU 300 is then required to predict the motion command value at the time point advanced from a proper acquisition timing of the target trajectory point by the response delay time period of the actuator.

However, the current time is delayed from the proper acquisition timing of the target trajectory point, and hence, when the current time is set as a reference, the time point advanced from the proper acquisition timing of the target trajectory point by the response delay time period of the actuator is a time point advanced from the current time by a time period obtained by subtracting the delay time period of the signal indicating the target trajectory point from the response delay time period of the actuator.

In view of this, when there is delay of the signal indicating the target trajectory point, predetermined time period PPT is set to a time period which corresponds to the time period obtained by subtracting the delay time period of the signal indicating the target trajectory point from the response delay time period of the actuator. With this setting, the delay of the traveling trajectory with respect to the target trajectory can be improved in consideration of the response delay of the actuator and the delay of the signal indicating the target trajectory point.

Furthermore, in the system in which the delay time period of the signal indicating the target trajectory point is equal to or longer than the response delay time period of the actuator, the prediction is not required, and hence VMCU 300 controls the actuator based on the motion command value at the current timing.

ADCU 200 may transmit the signal relating to the delay time period of the signal indicating the target trajectory point and the signal indicating the target trajectory point to VMCU 300 as a pair, and VMCU 300 may acquire information on the delay time period of the signal indicating the target trajectory point transmitted together with the signal indicating the target trajectory point, and may set predetermined time period PPT (number of times of repetition of simulation) by subtracting the acquired delay time period of the signal indicating the target trajectory point from the response delay time period of the actuator, which is stored in advance in a memory.

Figure 16:
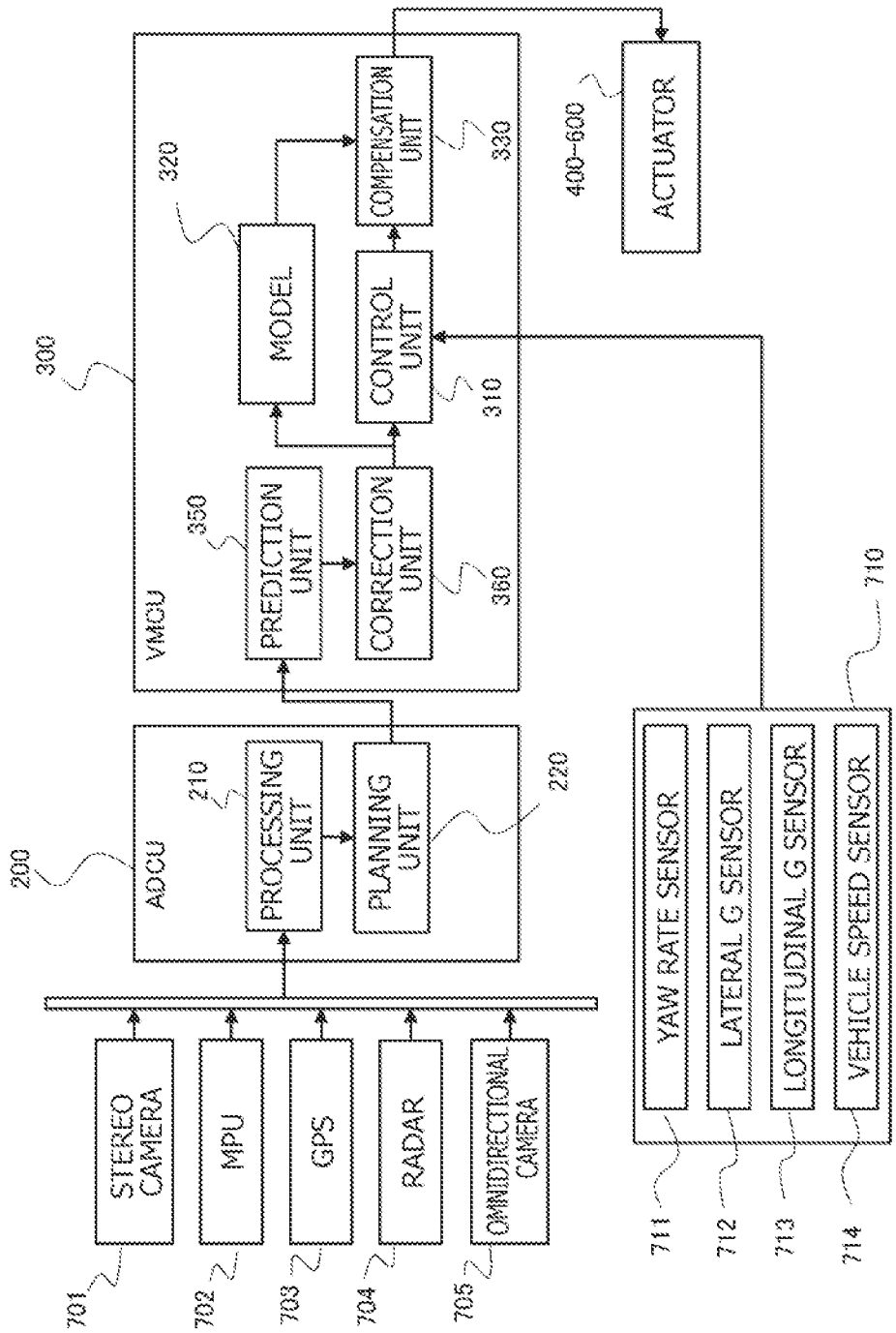
FIG. 16 is a block diagram for illustrating a detailed configuration of a vehicle control system.

FIG. 16 is an illustration of vehicle control system 100 according to a second embodiment of the present invention.

The same components as those of vehicle control system 100 illustrated in FIG. 7 are denoted by the same reference numerals, and detailed descriptions thereof are omitted.

VMCU 300 included in vehicle control system 100 of FIG. 16 includes a position change prediction unit 350 and a trajectory correction unit 360, in addition to vehicle motion control unit 310, vehicle model 320, and predictive compensation unit 330.

Position change prediction unit 350 and trajectory correction unit 360 are, as described later in detail, functional blocks for compensating for the delay of the signal indicating the target trajectory point acquired from ADCU 200.

That is, vehicle control system 100 of FIG. 16 has the abovementioned prediction function of obtaining a command value predicted to be calculated at the timing later by predetermined time period PPT to output the command value to the actuator, and a function of compensating for the delay of the signal indicating the target trajectory point.

The function of position change prediction unit 350 and trajectory correction unit 360 is briefly described with reference to FIG. 17 and FIG. 18.

Figure 17:
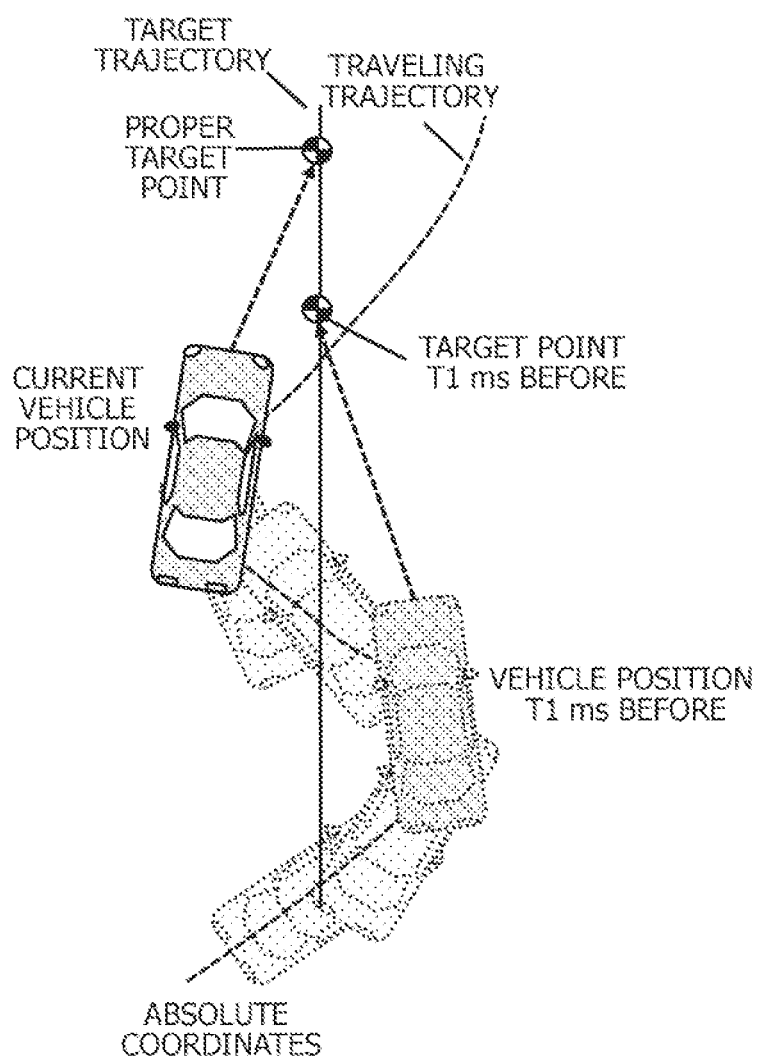
FIG. 17 is a diagram for illustrating correlation between a position of the vehicle and a target point on an absolute coordinate system.
Figure 18:
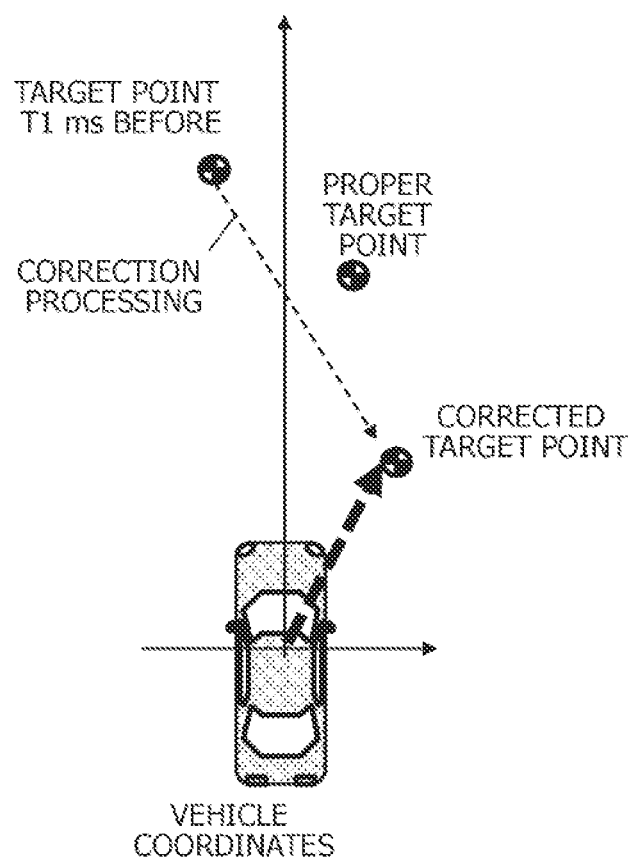
FIG. 18 is a diagram for illustrating correlation between the position of the vehicle and the target point on a vehicle coordinate system.

FIG. 17 is an illustration of correlation between the position of vehicle 10 and a target trajectory point on the absolute coordinate system, and FIG. 18 is an illustration of correlation between the position of vehicle 10 and the target trajectory point on the vehicle coordinate system.

The delay time period of the signal indicating the target trajectory point acquired by VMCU 300, which is caused by, for example, the delay of recognition of the outside situations, the delay of processing of recognition processing unit 210 and trajectory planning unit 220 of ADCU 200, and the delay of communication of the signal indicating the target trajectory point from ADCU 200 to VMCU 300, is represented by T1 (ms).

It is further assumed that a position of the vehicle at a time earlier by time period T1 from the current time, a current position of the vehicle, and a target trajectory point at the time earlier by time period T1 from the current time are positions illustrated in FIG. 17 on the absolute coordinate system.

In FIG. 17, there is exemplarily illustrated a state in which the position of the vehicle at the time earlier by time period T1 is deviated to a right side of the target trajectory and the current position of the vehicle is deviated to a left side of the target trajectory.

In addition, in FIG. 18, it is illustrated that the target trajectory point at the time earlier by time period T1 from the current time is positioned on a left side of the front-and-rear axis of the vehicle.

In the case of the current position of the vehicle illustrated in FIG. 17, it is requested to correct the trajectory to the right direction toward the target trajectory in a proper case, but the target trajectory point at the time earlier by time period T1 from the current time illustrated in FIG. 18 is positioned on the left side of the front-and-rear axis of the vehicle.

That is, in FIG. 17 and FIG. 18, it is illustrated that, due to the delay of the target trajectory point, the trajectory may be corrected toward an opposite direction to the proper direction.

Figure 19:
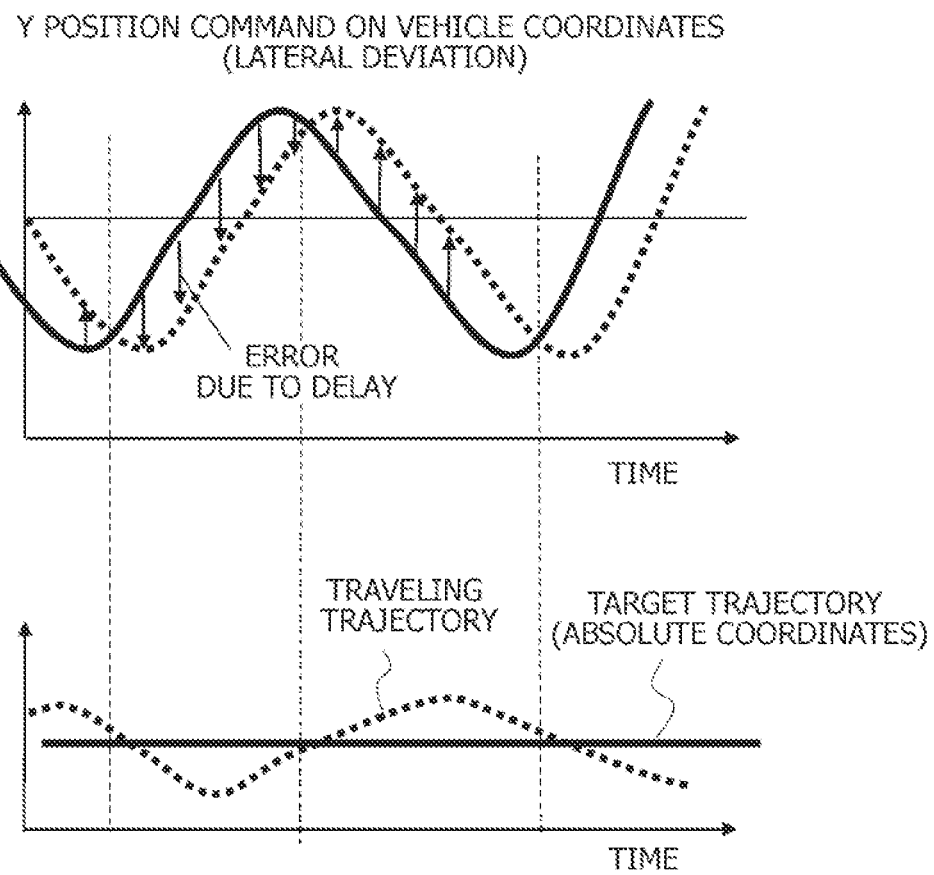
FIG. 19 is a graph for illustrating a trajectory error due to delay of the target trajectory point.

For this reason, when VMCU 300 determines the motion command based on the target trajectory point acquired from ADCU 200 with delay, that is, the target trajectory point at the time earlier by time period T1, as illustrated in FIG. 19, an error of the traveling trajectory (that is, a deviation in a lateral direction) with respect to the target trajectory consequently occurs.

In view of this, position change prediction unit 350 and trajectory correction unit 360 perform processing of converting the target trajectory point acquired from ADCU 200, that is, the target trajectory point at the time point earlier by the delay time period, into the target trajectory point obtained when the current position of the vehicle is set as a reference.

Figure 20:
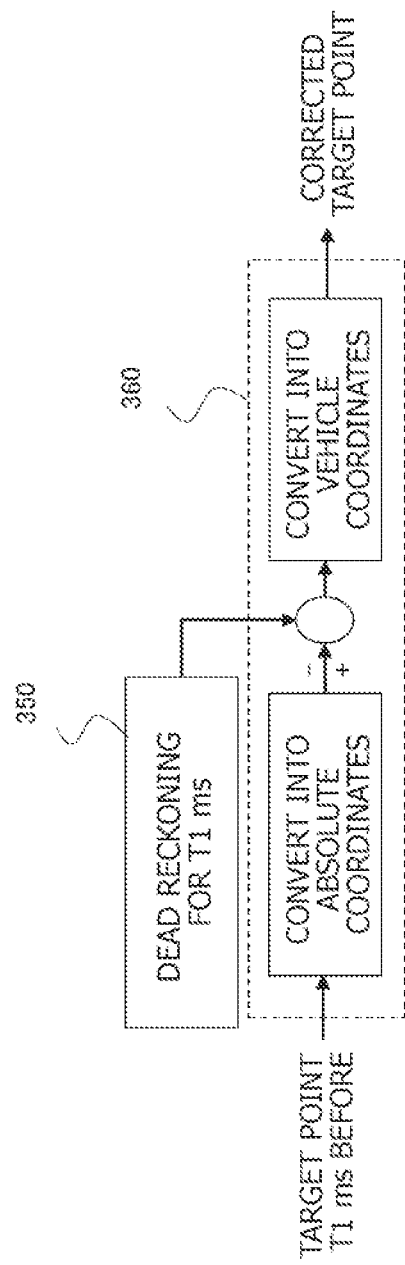
FIG. 20 is a block diagram for illustrating processing of correcting the target trajectory point.

FIG. 20 is a functional block diagram for specifically illustrating details of the processing of position change prediction unit 350 and trajectory correction unit 360.

Position change prediction unit 350 estimates the current position of the vehicle by dead reckoning.

Trajectory correction unit 360 converts the target trajectory point on the vehicle coordinate system acquired from ADCU 200, that is, the target trajectory point at the time earlier by time period T1, into a point on the absolute coordinate system, and converts relative positions of the current position of the vehicle estimated by position change prediction unit 350 and the target trajectory point on the absolute coordinate system into a point on the vehicle coordinate system, to thereby obtain the corrected target trajectory point being information on the target trajectory point obtained when the current position of the vehicle is set as the reference (refer to FIG. 18).

Then, vehicle motion control unit 310 accumulates the corrected target trajectory points acquired from trajectory correction unit 360 to generate the target trajectory.

In the following, the details of the processing of position change prediction unit 350 and trajectory correction unit 360 are described in more detail.

Figure 21:
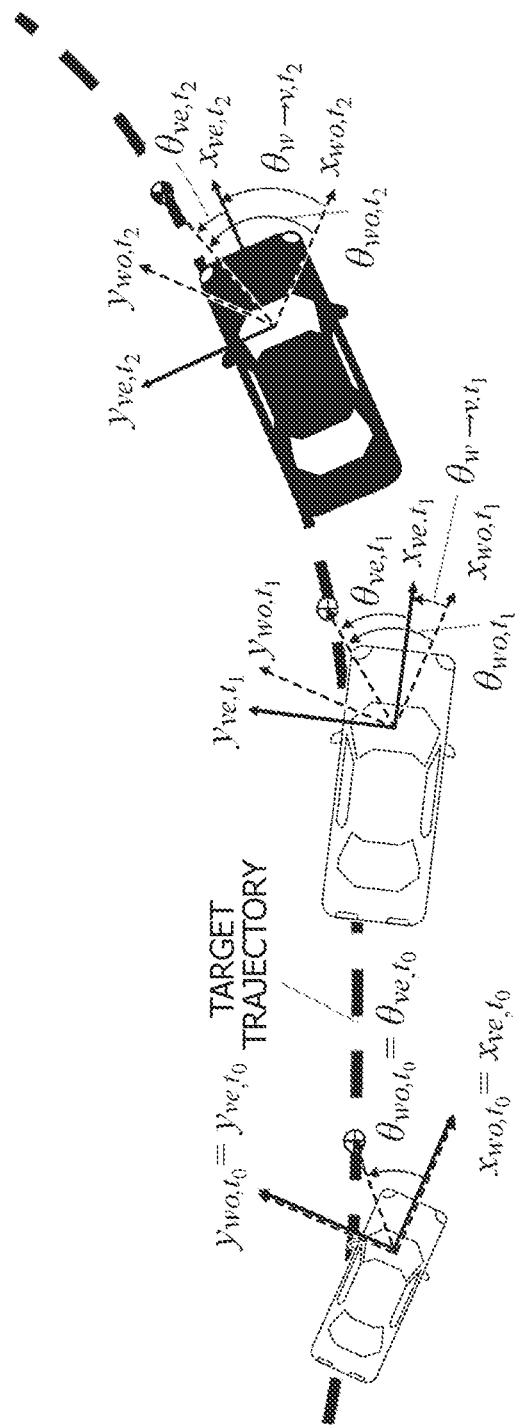
FIG. 21 is a diagram for illustrating definitions of the coordinate systems.
Figure 22:
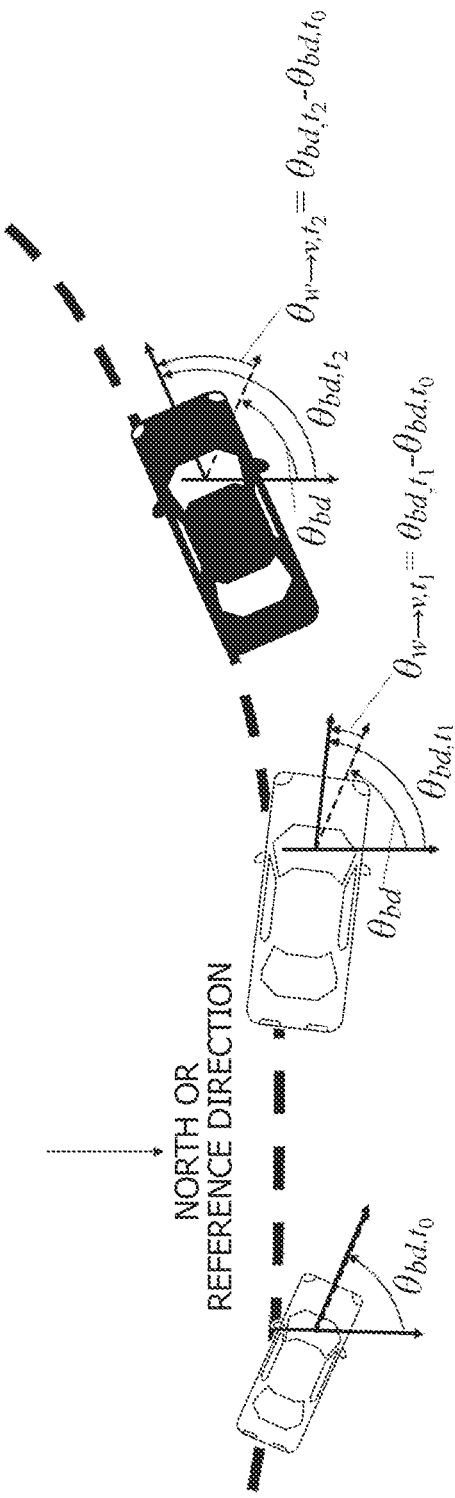
FIG. 22 is a diagram for illustrating a definition of a yaw angle.

FIG. 21 is a schematic diagram for illustrating definitions of the absolute coordinate system and the vehicle coordinate system, and FIG. 22 is an illustration of a definition of the yaw angle.

Symbol "x" represents a position in a direction in which the vehicle faces (that is, the front-and-rear direction), symbol "y" represents a position in the lateral direction, and symbol θ represents an angle in the yaw direction.

In the present Application, the absolute coordinate system is represented by a suffix "wo", and the vehicle coordinate system is represented by a suffix "ve".

A suffix ", to" means the coordinate system at a time to, and a time to is a time point at which calculation of θ is started. In general, time to corresponds to a time of start of the vehicle or a time of start of control.

Symbol $\theta_{bd}$ represents a yaw angle direction on an $x_{ve}$ axis acquired by recognition means included in vehicle 10, and any direction may be set as a reference direction. The yaw angle direction is set to a direction in which the north is set as 0 when the global positioning system (GPS) or the geomagnetic field is used, for example. Furthermore, when integration of a yaw rate sensor is used, such an integrated value as to satisfy $\theta_{bd,t_0}=0$ is set.

With the abovementioned means, the yaw angle at time $t_n$ can be recognized as $\theta_{bd,t_n}$. The absolute coordinate system is a coordinate system in which an $x_{wo}$ axis faces in a direction of $\theta_{bd,t_0}$, and the vehicle coordinate system is a coordinate system in which the $x_{ve}$ axis faces in a direction of $\theta_{bd,t_n}$.

Therefore, the direction of the vehicle coordinate system on the absolute coordinate system at time $t_n$ is obtained by Expression 1.

$$\theta_{w \to v, t_n} = \theta_{wo, t_n} - \theta_{ve, t_n} = \theta_{bd, t_n} - \theta_{bd, t_0} \quad [\text{Expression 1}]$$

Furthermore, an expression for converting coordinates on the absolute coordinate system into coordinates on the vehicle coordinate system is Expression 2.

$$\begin{pmatrix} x_{ve} \\ y_{ve} \\ \theta_{ve} \end{pmatrix} = \begin{pmatrix} \cos\theta_{w \to v} & \sin\theta_{w \to v} & 0 \\ -\sin\theta_{w \to v} & \cos\theta_{w \to v} & 0 \\ 0 & 0 & 1 \end{pmatrix} \begin{pmatrix} x_{wo} \\ y_{wo} \\ \theta_{wo} \end{pmatrix} + \begin{pmatrix} 0 \\ 0 \\ \theta_{w \to v} \end{pmatrix} \quad [\text{Expression 2}]$$

In addition, an expression for converting coordinates on the vehicle coordinate system into coordinates on the absolute coordinate system is Expression 3.

$$\begin{pmatrix} x_{wo} \\ y_{wo} \\ \theta_{wo} \end{pmatrix} = \begin{pmatrix} \cos\theta_{w \to v} & -\sin\theta_{w \to v} & 0 \\ \sin\theta_{w \to v} & \cos\theta_{w \to v} & 0 \\ 0 & 0 & 1 \end{pmatrix} \begin{pmatrix} x_{ve} \\ y_{ve} \\ \theta_{ve} \end{pmatrix} + \begin{pmatrix} 0 \\ 0 \\ -\theta_{w \to v} \end{pmatrix} \quad [\text{Expression 3}]$$

Next, the dead reckoning performed in position change prediction unit 350 is described in detail.

Figure 23:
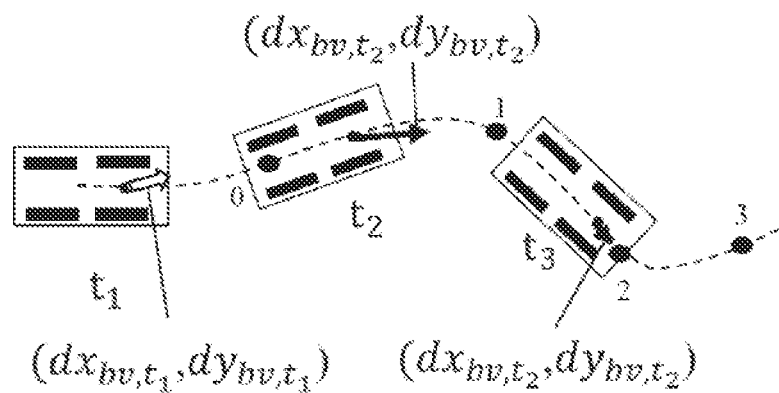
FIG. 23 is a diagram for illustrating a vehicle behavior viewed from outside.
Figure 24:
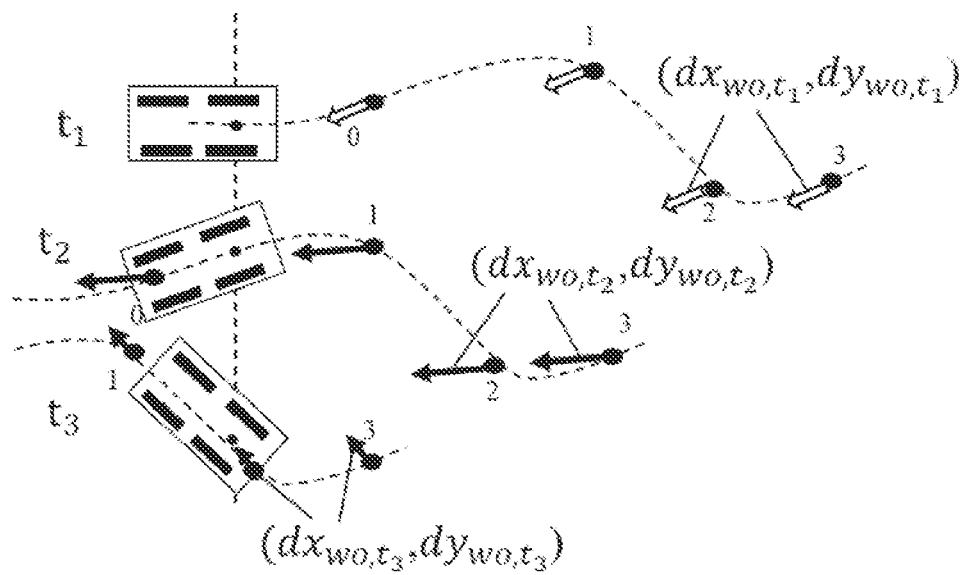
FIG. 24 is a diagram for illustrating a movement of a trajectory point on the absolute coordinate system.
Figure 25:
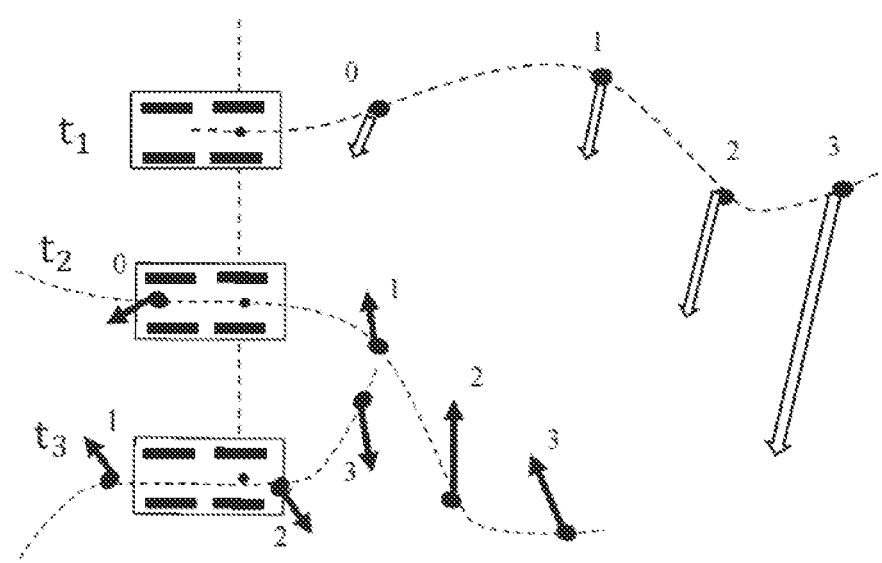
FIG. 25 is a diagram for illustrating a movement of a trajectory point on the vehicle coordinate system.

FIG. 23 to FIG. 25 are schematic diagrams for illustrating how the same vehicle behavior is viewed in different ways depending on the coordinate system. FIG. 23 is an illustration of the vehicle behavior viewed from the outside, FIG. 24 is an illustration of a movement of a trajectory point on the absolute coordinate system, and FIG. 25 is an illustration of a movement of a trajectory point on the vehicle coordinate system.

As illustrated in FIG. 23, when it is assumed that the vehicle traveling on the trajectory at each of times $t_1$, $t_2$, and $t_3$ is moving as indicated by each of the arrows of FIG. 23 at $(dx_{bv}, t_n, dy_{bv}, t_n)$, the position $(x_{bv}, t_n, y_{bv}, t_n)$ of the vehicle as viewed from the outside is obtained by Expression 4.

$$x_{bv,t_n} = \sum_{i=0}^{n} dx_{bv,t_i} \quad [\text{Expression 4}]$$

$$y_{bv,t_n} = \sum_{i=0}^{n} dy_{bv,t_i}$$

In this case, a movement amount $(dx_{wo}, dy_{wo})$ on the absolute coordinate system is expressed by Expression 5 through use of a movement amount $(dx_{bv}, dy_{bv})$ as viewed from the outside and a movement amount $(dx_{ve}, dy_{ve})$ on the vehicle coordinate system.

$$\begin{pmatrix} dx_{wo} \\ dy_{wo} \end{pmatrix} = -\begin{pmatrix} \cos\theta_{bd} & \sin\theta_{bd} \\ -\sin\theta_{bd} & \cos\theta_{bd} \end{pmatrix} \begin{pmatrix} dx_{bv} \\ dy_{bv} \end{pmatrix} = \quad [\text{Expression 5}]$$

$$\begin{pmatrix} \cos\theta_{w \to v} & -\sin\theta_{w \to v} \\ \sin\theta_{w \to v} & \cos\theta_{w \to v} \end{pmatrix} \begin{pmatrix} dx_{ve} \\ dy_{ve} \end{pmatrix}$$

When the dead reckoning of the yaw angle is performed by the yaw rate sensor, the accuracy of a zero point of the yaw rate sensor is important.

When a true value of a yaw rate is represented by $\omega_{re}$ and a sensed value thereof is represented by $\omega_{sn}$, due to an error $\Delta\omega_{zr}$ of the zero point of the yaw rate sensor, the yaw angle $\theta_{bd}$ being a result of the dead reckoning is obtained by Expression 6, and deviates from a true yaw angle $\theta_{re}$.

$$\omega_{sn} = \omega_{re} + \Delta\omega_{zr} \quad \text{[Expression 6]}$$

$$\theta_{bd} = \sum_{i=0}^{n}\omega_{sn,t_i} = \sum_{i=0}^{n}(\omega_{re,t_i}+\Delta\omega_{zr,t_i}) = \theta_{re}+\sum_{i=0}^{n}\Delta\omega_{zr,t_i}$$

From Expression 6, Om deviates from its true value as the time elapses unless the error $\lambda\omega_{zr}$ is 0. However, the yaw rate sensor has temperature drift and other characteristics, and it is thus extremely difficult to achieve $\Delta\omega_{zr}$=0. The yaw angle may also be acquired by other means such as the GPS or a geomagnetic sensor.

The target trajectory point acquired from ADCU 200 by VMCU 300 is desirably a current target trajectory point in a proper case, but due to the delay of calculation in ADCU 200 or the delay of communication between ADCU 200 and VMCU 300, for example, VMCU 300 consequently acquires information on the target trajectory point at the time earlier by the delay time period.

Figure 26:
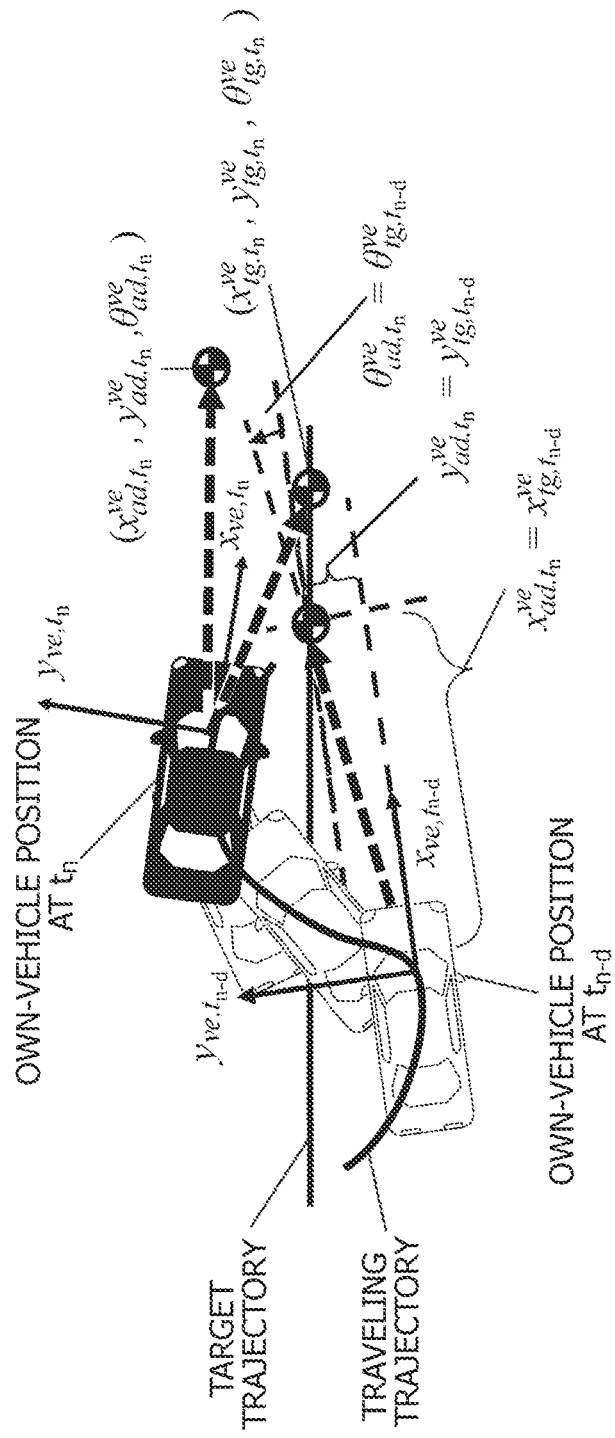
FIG. 26 is a diagram for illustrating processing of compensating for the delay of the target trajectory point.

In view of this, VMCU 300 performs dead reckoning of estimating the movement of the vehicle from a time $t_{n-d}$ earlier by the delay time period to current time $t_n$, and compensates for the delay time period based on an estimation result of the movement of the vehicle (refer to FIG. 26).

VMCU 300 performs the dead reckoning on the absolute coordinate system, and hence first converts information $(x^{ve}_{tg,t_{n-d}}, y^{ve}_{tg,t_{n-d}}, \theta^{ve}_{tg,t_{n-d}})$ on the target trajectory point on the vehicle coordinate system, which is acquired from ADCU 200, into information $(x^{wo}_{tg,t_{n-d}}, y^{wo}_{tg,t_{n-d}}, \theta^{wo}_{tg,t_{n-d}})$ on the absolute coordinate system in accordance with Expression 7.

$$\begin{pmatrix} x^{wo}_{tg,t_{n-d}} \\ y^{wo}_{tg,t_{n-d}} \\ \theta^{wo}_{tg,t_{n-d}} \end{pmatrix} = \begin{pmatrix} \cos\theta_{w\to v,t_{n-d}} & -\sin\theta_{w\to v,t_{n-d}} & 0 \\ \sin\theta_{w\to v,t_{n-d}} & \cos\theta_{w\to v,t_{n-d}} & 0 \\ 0 & 0 & 1 \end{pmatrix}\begin{pmatrix} x^{ve}_{tg,t_{n-d}} \\ y^{ve}_{tg,t_{n-d}} \\ \theta^{ve}_{tg,t_{n-d}} \end{pmatrix} + \begin{pmatrix} 0 \\ 0 \\ -\theta_{w\to v,t_{n-d}} \end{pmatrix} \quad \text{[Expression 7]}$$

Through use of Expression 8, Expression 10 is obtained from Expression 9.

$$\Delta\theta_{tg,t_{n-d}\to t_n}^{wo} = \theta_{w\to v,t_n} - \theta_{w\to v,t_{n-d}} \quad \text{[Expression 8]}$$

$$\theta_{tg,t_n}^{wo} = \Delta\theta_{tg,t_{n-d}\to t_n}^{wo} + \theta_{tg,t_{n-d}}^{wo} \quad \text{[Expression 9]}$$

$$\theta_{tg,t_n}^{wo} = \Delta\theta_{tg,t_{n-d}\to t_n}^{wo} + \theta_{tg,t_{n-d}}^{ve} - \theta_{w\to v,t_{n-d}} \quad \text{[Expression 10]}$$

Furthermore, through use of Expression 11, Expression 13 is obtained from Expression 12.

$$\begin{pmatrix} \Delta x^{wo}_{tg,t_{n-d}\to t_n} \\ \Delta y^{wo}_{tg,t_{n-d}\to t_n} \end{pmatrix} = \sum_{i=n-d+1}^{n}\begin{pmatrix} dx_{wo,t_i} \\ dy_{wo,t_i} \end{pmatrix} \quad \text{[Expression 11]}$$

$$\begin{pmatrix} x^{wo}_{tg,t_n} \\ y^{wo}_{tg,t_n} \end{pmatrix} = \sum_{i=n-d+1}^{n}\begin{pmatrix} dx_{wo,t_i} \\ dy_{wo,t_i} \end{pmatrix} + \begin{pmatrix} x^{wo}_{tg,t_{n-d}} \\ y^{wo}_{tg,t_{n-d}} \end{pmatrix} \quad \text{[Expression 12]}$$

$$\begin{pmatrix} x^{wo}_{tg,t_n} \\ y^{wo}_{tg,t_n} \end{pmatrix} = \begin{pmatrix} \Delta x^{wo}_{tg,t_{n-d}\to t_n} \\ \Delta y^{wo}_{tg,t_{n-d}\to t_n} \end{pmatrix} + \begin{pmatrix} \cos\theta_{w\to v,t_{n-d}} & -\sin\theta_{w\to v,t_{n-d}} \\ \sin\theta_{w\to v,t_{n-d}} & \cos\theta_{w\to v,t_{n-d}} \end{pmatrix}\begin{pmatrix} x^{ve}_{tg,t_{n-d}} \\ y^{ve}_{tg,t_{n-d}} \end{pmatrix} \quad \text{[Expression 13]}$$

Therefore, from Expression 10 and Expression 13, the acquired target trajectory point is subjected to conversion of Expression 14 to become the target trajectory point on the vehicle coordinate system.

$$\begin{pmatrix} x^{wo}_{tg,t_n} \\ y^{wo}_{tg,t_n} \\ \theta^{wo}_{tg,t_n} \end{pmatrix} = \begin{pmatrix} \Delta x^{wo}_{tg,t_{n-d}\to t_n} \\ \Delta y^{wo}_{tg,t_{n-d}\to t_n} \\ \Delta\theta^{wo}_{tg,t_{n-d}\to t_n} \end{pmatrix} + \begin{pmatrix} \cos\theta_{w\to v,t_{n-d}} & -\sin\theta_{w\to v,t_{n-d}} & 0 \\ \sin\theta_{w\to v,t_{n-d}} & \cos\theta_{w\to v,t_{n-d}} & 0 \\ 0 & 0 & 1 \end{pmatrix}\begin{pmatrix} x^{ve}_{ad,t_n} \\ y^{ve}_{ad,t_n} \\ \theta^{ve}_{ad,t_n} \end{pmatrix} + \begin{pmatrix} 0 \\ 0 \\ -\theta_{w\to v,t_{n-d}} \end{pmatrix} \quad \text{[Expression 14]}$$

Information required for the conversion of Expression 14 is "$\Delta x^{wo}_{tg}, t_{n-d}\to t_n, \Delta y^{wo}_{tg}, t_{n-d}\to t_n, \Delta\theta_{w\to v}, t_{n-d}$." VMCU 300 is required to store the movement amount of the position of the vehicle from time $t_{n-d}$ to time $t_n$ and the yaw angle of the own vehicle at time $t_{n-d}$, and includes a buffer configured to store histories of the movement amount of the position of the vehicle from time $t_{n-d}$ to time $t_n$.

In the manner described above, position change prediction unit 350 and trajectory correction unit 360 of VMCU 300 perform the processing of converting, based on the dead reckoning, the target trajectory point acquired from ADCU 200 into the target trajectory point obtained when the current position of the vehicle is set as the reference.

With the abovementioned conversion processing, the delay of the information on the target trajectory point is compensated for, and further, predictive compensation unit 330 of VMCU 300 compensates for the delay of the response to the command to the actuator.

As described above, predictive compensation unit 330 sets the vehicle coordinate system at time to of start of calculation as the reference coordinate system, repeats the simulation of the vehicle behavior after time to in accordance with vehicle model 320 the number of times which corresponds to predetermined time period PPT (that is, "n" times corresponding to the task cycle), and outputs the motion command obtained when the simulation has been repeated "n" times to actuators 400-600.

In this case, the delay regarding the information on the target trajectory point has been compensated for, and hence predictive compensation unit 330 predicts the motion command value at the time point advanced from the current time by the response delay time period of the actuator.

In short, predictive compensation unit 330 repeats the simulation "n" times, which correspond to the response delay time period of the actuator, and outputs the motion command obtained in the n-th simulation to actuators 400-600.

Therefore, according to the vehicle control system illustrated in FIG. 16, it is possible to compensate for both of the delay of the information on the target trajectory point and the response delay of the actuator, and it is thus possible to improve the delay of the traveling trajectory with respect to the target trajectory.

The technical concepts described in the abovementioned embodiments may be used in combination as required, as long as no conflict arises.

Furthermore, although the details of the present invention are specifically described above with reference to the preferred embodiments, it is apparent to those skilled in the art that various modified aspects may be adopted based on the basic technical concepts and teachings of the present invention.

For example, predetermined time period PPT to be used in predictive compensation unit 330 may be changed based on the error of the actual traveling trajectory with respect to the target trajectory, that is, the deviation in the lateral direction.

Furthermore, when the vehicle speed is equal to or lower than a threshold value, prediction by predictive compensation unit 330 may be stopped, and the current command may be output to the actuator. In addition, when the vehicle speed is higher than the threshold value, predictive compensation unit 330 may perform prediction, and may output to the actuator the command predicted to be calculated after predetermined time period PPT.

Furthermore, the vehicle control system according to the embodiments described above includes ADCU 200 and VMCU 300 separately, and the microcomputer configured to obtain the target trajectory point and the microcomputer configured to obtain the motion command based on the target trajectory to output the motion command to the actuator are provided separately. Instead, the vehicle control system may be a system in which one microcomputer performs both of the calculation of the target trajectory point and the calculation of the motion command based on the target trajectory.

Technical ideas obtained from the embodiments described above are described below.

The vehicle control device is configured to, in one aspect thereof: acquire a signal relating to a target trajectory, which is a trajectory on which a vehicle is to travel; acquire a signal relating to a traveling state of the vehicle; input the signal relating to the target trajectory and the signal relating to the traveling state to a prediction model to predict the traveling state exhibited when a motion command based on the signal relating to the target trajectory and the signal relating to the traveling state is given to an actuator configured to control a motion of the vehicle; repeat inputting the predicted traveling state to the prediction model to predict the traveling state a predetermined number of times; and output, to the actuator, the motion command predicted when the prediction has been repeated the predetermined number of times.

REFERENCE SYMBOL LIST

100 vehicle control system
200 automatic driving control unit (ADCU)
210 recognition processing unit
220 trajectory planning unit
300 vehicle motion control unit (VMCU)
310 vehicle motion control unit
320 vehicle model
330 predictive compensation unit
400 engine
500 hydraulic brake device
600 power steering device

The invention claimed is:

1. A vehicle controller mounted on a vehicle, which is configured to:
   acquire, from a higher-level controller, a signal relating to a target trajectory, which is a trajectory on which the vehicle is to travel;
   acquire a signal relating to a position of the vehicle;
   predict, based on the signal relating to the target trajectory and the signal relating to the position of the vehicle, a behavior of the vehicle exhibited when a motion command for reducing a deviation between the position of the vehicle and the target trajectory is given to the vehicle and then predict a position of the vehicle at a time advanced from a current time by a fixed time;
   repeat a prediction process, the prediction process comprising predicting a behavior of the vehicle exhibited when a motion command for reducing a deviation between the position of the vehicle predicted in a preceding prediction process and the target trajectory is given to the vehicle and then predicting a position of the vehicle at a time advanced by the fixed time, thereby predicting a motion command at a time advanced from the current time by a predetermined time period corresponding to a delay element in a control of a motion of the vehicle; and
   output the predicted motion command at the time advanced by the predetermined time period to an actuator configured to control the motion of the vehicle.

2. The vehicle controller according to claim 1, wherein the delay element includes response delay of the actuator.

3. The vehicle controller according to claim 2, wherein the delay element further includes delay of the signal relating to the target trajectory.

4. The vehicle controller according to claim 3, wherein the predetermined time period is a time period obtained by subtracting, from a response delay time period of the actuator, a delay time period of the signal relating to the target trajectory.

5. The vehicle controller according to claim 4, wherein the delay time period of the signal relating to the target trajectory is a delay time period of a signal having the largest delay among the plurality of signals relating to the target trajectory.

6. The vehicle controller according to claim 3, wherein when the delay time period of the signal relating to the target trajectory is equal to or longer than the response delay time period of the actuator, the vehicle control device is configured to set a current time as a time that is later by the predetermined time period.

7. The vehicle controller according to claim 2, wherein the actuator is a steering device for the vehicle.

8. The vehicle controller according to claim 1, wherein the delay element includes delay of the signal relating to the target trajectory.

9. A vehicle control method performed by a vehicle controller mounted on a vehicle, the method comprising:
   acquiring, from a higher-level controller, a signal relating to a target trajectory, which is a trajectory on which the vehicle is to travel;
   acquiring a signal relating to a position of the vehicle;
   predicting, based on the signal relating to the target trajectory and the signal relating to the position of the vehicle, a behavior of the vehicle exhibited when a motion command for reducing a deviation between the position of the vehicle and the target trajectory is given to the vehicle and then predicting a position of the vehicle at a time advanced from a current time by a fixed time;

repeating a prediction process, the prediction process comprising predicting a behavior of the vehicle exhibited when a motion command for reducing a deviation between the position of the vehicle predicted in a preceding prediction process and the target trajectory is given to the vehicle and then predicting a position of the vehicle at a time advanced by the fixed time, thereby predicting a motion command at a time advanced from the current time by a predetermined time period corresponding to a delay element in a control of a motion of the vehicle; and outputting the predicted motion command at the time advanced by the predetermined time period to an actuator configured to control the motion of the vehicle.

10. A vehicle control system comprising:

a first controller configured to obtain a target trajectory, which is a trajectory on which a vehicle is to travel; and a second controller configured to:

acquire a signal relating to the target trajectory, which is output from the first controller;

acquire a signal relating to a position of the vehicle;

predict, based on the signal relating to the target trajectory and the signal relating to the position of the vehicle, a behavior of the vehicle exhibited when a motion command for reducing a deviation between the position of the vehicle and the target trajectory is given to the vehicle and then predict a position of the vehicle at a time advanced from a current time by a fixed time;

repeat a prediction process, the prediction process comprising predicting a behavior of the vehicle exhibited when a motion command for reducing a deviation between the position of the vehicle predicted in a preceding prediction process and the target trajectory is given to the vehicle and then predicting a position of the vehicle at a time advanced by the fixed time, thereby predicting a motion command at a time advanced from the current time by a predetermined time period corresponding to a delay element in a control of a motion of the vehicle; and output the predicted motion command at the time advanced by the predetermined time period to an actuator configured to control the motion of the vehicle.

* * * * *